United States Patent
Liang

(10) Patent No.: US 11,603,330 B2
(45) Date of Patent: Mar. 14, 2023

(54) COATED GLASS HAVING ANTIFOG PROPERTIES

(71) Applicant: GUARDIAN GLASS, LLC, Auburn Hills, MI (US)

(72) Inventor: Liang Liang, Taylor, MI (US)

(73) Assignee: GUARDIAN GLASS, LLC, Auburn Hills, MI (US)

( * ) Notice: Subject to any disclaimer, the term of this patent is extended or adjusted under 35 U.S.C. 154(b) by 710 days.

(21) Appl. No.: 16/434,222

(22) Filed: Jun. 7, 2019

(65) Prior Publication Data

US 2019/0375676 A1 Dec. 12, 2019

Related U.S. Application Data

(60) Provisional application No. 62/682,570, filed on Jun. 8, 2018.

(51) Int. Cl.

| | | |
|---|---|---|
| *C03C 17/32* | (2006.01) | |
| *C03C 17/30* | (2006.01) | |
| *C09D 133/14* | (2006.01) | |
| *C09D 133/26* | (2006.01) | |
| *C09D 133/04* | (2006.01) | |
| *C09D 151/08* | (2006.01) | |
| *C09D 155/00* | (2006.01) | |
| *C08L 61/28* | (2006.01) | |
| *C08L 83/04* | (2006.01) | |

(52) U.S. Cl.
CPC .............. *C03C 17/32* (2013.01); *C03C 17/30* (2013.01); *C09D 133/14* (2013.01); *C09D 133/26* (2013.01); *C03C 2217/75* (2013.01); *C03C 2218/11* (2013.01)

(58) Field of Classification Search
None
See application file for complete search history.

(56) References Cited

U.S. PATENT DOCUMENTS

| | | | |
|---|---|---|---|
| 5,180,760 A | 1/1993 | Oshibe | |
| 2008/0164788 A1* | 7/2008 | Riblier | A47F 3/0434 |
| | | | 428/34 |
| 2010/0316806 A1* | 12/2010 | He | C09D 133/16 |
| | | | 427/379 |
| 2017/0204313 A1 | 7/2017 | Karunakaran et al. | |
| 2017/0341976 A1 | 11/2017 | Foti et al. | |

FOREIGN PATENT DOCUMENTS

| | | | | |
|---|---|---|---|---|
| JP | 2004182914 A | 7/2004 | | |
| RU | 2325957 C2 | 6/2008 | | |
| RU | 2593871 C2 | 8/2016 | | |
| SU | 812779 A1 | 3/1981 | | |
| WO | WO-2007035801 A2 * | 3/2007 | ........... | A47F 3/0434 |
| WO | 2017123381 A2 | 7/2017 | | |

OTHER PUBLICATIONS

International Search Report and Written Opinion for International Application No. PCT/IB2019/054765, dated Nov. 12, 2019, 10 pages.
International Preliminary Report on Patentability for International Application No. PCT/IB2019/054765, dated Dec. 17, 2020, 8 pages.
RU office action and search report received for application No. 2020143545, dated Dec. 1, 2021, 20 pages (10 pages of English translation and 10 pages of original document).
Bondarenko, V.M., et al., "Anti-steaming treatment of glass surfaces—by coating with aq. solm. of acrylamide!-acrylic! acid copolymer and heating to prescribed temp," WPI Thomson, XP002569557, p. 01, Mar. 15, 1981.
Ogata T: "Composition of photocurable anticlouding agent for forming fog-prevention film coated products, contains urethane polymer, diacrylate, polyalkylene-glycol acrylate, alkyl polyol polyacrylate and photocuring catalyst", WPI/2017 Clarivate Analytics,, vol. 2004, No. 50, pp. 2, Jul. 2, 2004 (Jul. 2, 2004), XP002769153.

* cited by examiner

*Primary Examiner* — Ramsey Zacharia

(57) ABSTRACT

A coated glass substrate is disclosed as well as a method of making the coated glass substrate. The coated glass substrate comprises a glass substrate and a coating on a surface of the glass substrate wherein the coating includes a binder. The binder may include an interpenetrating network. For example, the network may include a crosslinked polyacrylate and a crosslinked polyacrylamide. In addition, the transparency of the coated substrate after one of the following conditions may be within 10% of the transparency of the coated substrate prior to the condition: (i) wherein the coated substrate is stored at a temperature of 0° C. or less and then exposed to an environment at 21° C. and 70% humidity or (ii) wherein the coated substrate is positioned within 100° C. steam for one minute.

20 Claims, No Drawings

COATED GLASS HAVING ANTIFOG PROPERTIES

CROSS-REFERENCE TO RELATED APPLICATION

The present application claims filing benefit of U.S. Provisional Patent Application Ser. No. 62/682,570 having a filing date of Jun. 8, 2018, and which is incorporated herein by reference in its entirety

BACKGROUND

A common problem with glass substrates is their tendency to fog when exposed to high humidity or temperature or a substantial differential in humidity or temperature. Typically, in these situations, moisture condenses on the surface of the glass substrate thereby making it difficult to see through the substrate or when the substrate includes a mirror, making it difficult to see a reflection. Various types of coatings have been employed to reduce or eliminate this problem. However, deficiencies remain. For instance, some of these coatings may not provide adequate antifog properties while others may not provide the desire mechanical properties and/or chemical resistance.

As a result, there is a need to provide a coating on a glass substrate with improved antifog properties while also exhibiting desired mechanical properties and/or chemical resistance.

SUMMARY

In general, one embodiment of the present disclosure is directed to a coated glass substrate. The coated glass substrate comprises a glass substrate. The coated glass substrate further comprises a coating on a surface of the glass substrate. The coating comprises a binder including a polyacrylate and a polyacrylamide.

In general, another embodiment of the present disclosure is directed to a coated glass substrate comprising a glass substrate and a coating on a surface of the glass substrate wherein the coating includes a binder. The transparency of the coated substrate after one of the following conditions is within 10% of the transparency of the coated substrate prior to the condition: (i) wherein the coated substrate is stored at a temperature of 0° C. or less and then exposed to an environment at 21° C. and 70% humidity or (ii) wherein the coated substrate is positioned within 100° C. steam for one minute.

In general, a further embodiment of the present disclosure is directed to a method of forming a coated glass substrate, such as the aforementioned. The method may comprise a step of applying a coating formulation to a glass substrate. The coating formulation comprises a first polymerizable compound, a second polymerizable compound, and at least one crosslinking agent. The method further comprises a step of polymerizing the compounds.

DETAILED DESCRIPTION

Definitions

It is to be understood that the terminology used herein is for the purpose of describing particular embodiments only and is not intended to limit the scope of the present invention.

"Alkyl" refers to a monovalent saturated aliphatic hydrocarbyl group, such as those having from 1 to 25 carbon atoms and, in some embodiments, from 1 to 12 carbon atoms. "$C_{x-y}$alkyl" refers to alkyl groups having from x to y carbon atoms. This term includes, by way of example, linear and branched hydrocarbyl groups such as methyl ($CH_3$), ethyl ($CH_3CH_2$), n-propyl ($CH_3CH_2CH_2$), isopropyl (($CH_3)_2$ CH), n-butyl ($CH_3CH_2CH_2CH_2$), isobutyl (($CH_3)_2$ $CHCH_2$), sec-butyl (($CH_3$)($CH_3CH_2$)CH), t-butyl (($CH_3)_3$ C), n-pentyl ($CH_3CH_2CH_2CH_2CH_2$), neopentyl (($CH_3)_3$ $CCH_2$), hexyl ($CH_3(CH_2CH_2CH_2)_5$), etc.

"Substituted alkyl" refers to an alkyl group having from 1 to 5 and, in some embodiments, 1 to 3 or 1 to 2 substituents selected from alkenyl, substituted alkenyl, alkynyl, substituted alkynyl, alkoxy, substituted alkoxy, acyl, acylamino, acyloxy, amino, substituted amino, quaternary amino, aminocarbonyl, imino, amidino, aminocarbonylamino, amidinocarbonylamino, aminothiocarbonyl, aminocarbonylamino, aminothiocarbonylamino, aminocarbonyloxy, aminosulfonyl, aminosulfonyloxy, aminosulfonylamino, aryl, substituted aryl, aryloxy, substituted aryloxy, arylthio, substituted arylthio, azido, carboxyl, carboxyl ester, (carboxyl ester)amino, (carboxyl ester)oxy, cyano, cycloalkyl, substituted cycloalkyl, cycloalkyloxy, substituted cycloalkyloxy, cycloalkylthio, substituted cycloalkylthio, guanidino, substituted guanidino, halo, hydroxy, hydroxyamino, alkoxyamino, hydrazino, substituted hydrazino, heteroaryl, substituted heteroaryl, heteroaryloxy, substituted heteroaryloxy, heteroarylthio, substituted heteroarylthio, heterocyclic, substituted heterocyclic, heterocyclyloxy, substituted heterocyclyloxy, heterocyclylthio, substituted heterocyclylthio, nitro, oxo, thione, spirocycloalkyl, phosphate, phosphonate, phosphinate, phosphonamidate, phosphorodiamidate, phosphoramidate monoester, cyclic phosphoramidate, cyclic phosphorodiamidate, phosphoramidate diester, sulfate, sulfonate, sulfonyl, substituted sulfonyl, sulfonyloxy, thioacyl, thiocyanate, thiol, alkylthio, and substituted alkylthio, wherein said substituents are as defined herein.

"Alkenyl" refers to a linear or branched hydrocarbyl group having from 2 to 10 carbon atoms and in some embodiments from 2 to 6 carbon atoms or 2 to 4 carbon atoms and having at least 1 site of vinyl unsaturation (>0=0<). For example, ($C_x$-$C_y$)alkenyl refers to alkenyl groups having from x to y carbon atoms and is meant to include for example, ethenyl, propenyl, 1,3-butadienyl, and so forth.

"Alkynyl" refers to a linear monovalent hydrocarbon radical or a branched monovalent hydrocarbon radical containing at least one triple bond. The term "alkynyl" is also meant to include those hydrocarbyl groups having one triple bond and one double bond. For example, ($C_2$-$C_6$)alkynyl is meant to include ethynyl, propynyl, and so forth.

"Alkoxy" refers to a straight or branched alkoxy group containing the specified number of carbon atoms. For example, $C_{1-6}$alkoxy means a straight or branched alkoxy group containing at least 1, and at most 6, carbon atoms. Examples of "alkoxy" as used herein include, but are not limited to, methoxy, ethoxy, prop-1-oxy, prop-2-oxy, but-1-oxy, but-2-oxy, 2-methylprop-1-oxy, 2-methylprop-2-oxy, pentoxy and hexyloxy.

"Aryl" refers to a carbocyclic aromatic moiety (such as phenyl or naphthyl) containing the specified number of carbon atoms, particularly from 6-10 carbon atoms. Examples of aryl radicals include, but are not limited to, phenyl, naphthyl, indenyl, azulenyl, fluorenyl, anthracenyl, phenanthrenyl, tetrahydronaphthyl, indanyl, phenanthridinyl and the like. Unless otherwise indicated, the term "aryl" also includes each possible positional isomer of an aromatic hydrocarbon radical, such as in 1-naphthyl, 2-naphthyl, 5-tetrahydronaphthyl, 6-tetrahydronaphthyl, 1-phenanthridinyl, 2-phenanthridinyl, 3-phenanthridinyl, 4-phenanthridinyl, 7-phenanthridinyl, 8-phenanthridinyl, 9-phenanthridinyl and 10-phenanthridinyl. Examples of aryl radicals include, but are not limited to, phenyl, naphthyl, indenyl, azulenyl, fluorenyl, anthracenyl, phenanthrenyl, tetrahydronaphthyl, indanyl, phenanthridinyl and the like.

It should be understood that the aforementioned definitions encompass unsubstituted groups, as well as groups substituted with one or more other groups as is known in the art. For example, an alkyl group may be substituted with from 1 to 8, in some embodiments from 1 to 5, in some embodiments from 1 to 3, and in some embodiments, from 1 to 2 substituents selected from alkyl, alkenyl, alkynyl, alkoxy, acyl, acylamino, acyloxy, amino, quaternary amino, amide, imino, amidino, aminocarbonylamino, amidinocarbonylamino, aminothiocarbonyl, aminocarbonylamino, aminothiocarbonylamino, aminocarbonyloxy, aminosulfonyl, aminosulfonyloxy, aminosulfonylamino, aryl, aryloxy, arylthio, azido, carboxyl, carboxyl ester, (carboxyl ester) amino, (carboxyl ester)oxy, cyano, cycloalkyl, cycloalkyloxy, cycloalkylthio, epoxy, guanidino, halo, haloalkyl, haloalkoxy, hydroxy, hydroxyamino, alkoxyamino, hydrazino, heteroaryl, heteroaryloxy, heteroarylthio, heterocyclyl, heterocyclyloxy, heterocyclylthio, nitro, oxo, oxy, thione, phosphate, phosphonate, phosphinate, phosphonamidate, phosphorodiamidate, phosphoramidate monoester, cyclic phosphoramidate, cyclic phosphorodiamidate, phosphoramidate diester, sulfate, sulfonate, sulfonyl, substituted sulfonyl, sulfonyloxy, thioacyl, thiocyanate, thiol, alkylthio, etc., as well as combinations of such substituents.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

In general, the present disclosure is directed to a coated glass substrate having antifog properties. In particular, the coating includes a binder. The present inventors have discovered that the coating disclosed herein exhibits improved antifog properties as well as the desired mechanical properties and chemical resistance in comparison to other types of commercially available coatings for antifog applications.

For antifog properties, it is generally desired to have a coating which allows for transparency through the substrate. That is, after conducting an antifog test as further defined herein, the substrate exhibits a transparency that is within 10%, such as within 8%, such as within 5%, such as within 4%, such as within 3%, such as within 2%, such as within 1% of the transparency of the coated substrate prior to the antifog test. In another embodiment, after conducting the antifog test, the substrate exhibits a transparency that is within 10%, such as within 8%, such as within 5%, such as within 4%, such as within 3%, such as within 2%, such as within 1% of the transparency of the raw glass (uncoated substrate). The antifog test as mentioned above may be any one (or a combination of the following): (a) exposing the coated substrate immediately above 100° C. steam for one minute; (b) storing in a refrigerator at 1° C. for one hour and then exposing to an environment at 21° C. and 70% humidity; (c) storing in a freezer at −18° C. for one hour and then exposing to an environment at 21° C. and 70% humidity; (d) storing in a freezer at −6.7° C. for one hour and then exposing to an environment at 21° C. and 70% humidity; (e) storing in a freezer at −5° C. and exposing to an environment at 22° C. and 70% humidity; and/or (f) storing in a freezer at −20° C. for 20 minutes and exposing to an environment at 23° C. and 50-60% humidity. In one particular embodiment, the antifog test as mentioned above may be any one (or a combination of the following): (i) wherein the coated substrate is stored at a temperature of 0° C. or less and then exposed to an environment at 21° C. and 70% humidity or (ii) wherein the coated substrate is positioned within 100° C. steam for one minute.

However, when the glass substrate is a reflective substrate such as a mirror, it may be desired to have a coated substrate that allows for reflection. That is, after conducting an antifog test as further defined herein, the substrate may exhibit a reflection that is within 10%, such as within 8%, such as within 5%, such as within 4%, such as within 3%, such as within 2%, such as within 1% of the reflection of the coated substrate prior to the antifog test. In another embodiment, after conducting the antifog test, the substrate exhibits a reflection that is within 10%, such as within 8%, such as within 5%, such as within 4%, such as within 3%, such as within 2%, such as within 1% of the reflection of the raw glass (uncoated substrate). The antifog tests may be the same as mentioned above.

In addition, the coated glass may be transparent allowing one to clearly see through the glass. That is, the glass may have a transparency of about 75% or more, such as about 80% or more, such as about 85% or more, such as about 90% or more, such as about 95% or more. Such transparency may be at a particular wavelength (e.g., 550 nm) or over a range of wavelengths, such as from 500 nm to 900 nm, such as from 500 nm to 800 nm, such as from 500 nm to 700 nm, such as from 500 nm to 600 nm. Such transparency may be for the coated glass prior to and/or after conducting an antifog test.

In addition, the transparency of the coated glass may be within about 10%, such as within about 5%, such as within about 4%, such as within about 3%, such as within about 2%, such as within about 1%, such as within about 0.5% of the transparency of the uncoated glass. Such differences in percent transparency may be at a particular wavelength (e.g., 550 nm) or over a range of wavelengths, such as from 500 nm to 900 nm, such as from 500 nm to 800 nm, such as from 500 nm to 700 nm, such as from 500 nm to 600 nm. The coated glass may have a haze of about 10% or less, such as about 8% or less, such as about 5% or less, such as about 4% or less, such as about 3% or less, such as about 2% or less, such as about 1% or less.

The coated glass may have a reflection of about 20% or less, such as about 15% or less, such as about 10% or less, such as about 8% or less, such as about 5% or less, such as about 4% or less, such as about 2% or less, such as about 1% or less. However, when applied on a mirror, the coated glass may have a high reflection. For instance, the reflection may be about 50% or more, such as about 60% or more, such as about 70% or more, such as about 80% or more, such as about 85% or more, such as about 90% or more. Such reflection may be at a particular wavelength (e.g., 550 nm) or over a range of wavelengths, such as from 500 nm to 900 nm, such as from 500 nm to 800 nm, such as from 500 nm to 700 nm, such as from 500 nm to 600 nm. Such reflection may be for the coated glass prior to and/or after conducting an antifog test.

In addition, the reflection of the coated glass may be within about 10%, such as within about 5%, such as within about 4%, such as within about 3%, such as within about 2%, such as within about 1%, such as within about 0.5% of the reflection of the uncoated glass. Such differences in percent reflection may be at a particular wavelength (e.g., 550 nm) or over a range of wavelengths, such as from 500 nm to 900 nm, such as from 500 nm to 800 nm, such as from 500 nm to 700 nm, such as from 500 nm to 600 nm.

For antifog properties, it may also generally be desired to have a coating which exhibits a low water contact angle, thereby suggesting the presence of a hydrophilic surface or even a superhydrophilic surface. In this regard, the coating described herein may exhibit a water contact angle of about 25° or less, such as about 20° or less, such as about 15° or less, such as about 10° or less, such as about 9° or less, such as about 8° or less, such as about 7° or less, such as about 5° or less. The water contact angle may be more than 0°, such as about 1° or more, such as about 3° or more, such as about 5° or more, such as about 10° or more. In some instances, such water contact angle may be realized at or after 1 second, such as at or after 2 seconds, such as at or after 3 seconds, such as at or after 4 seconds, such as at or after 5 seconds, such as at or after 6 seconds, such as at or after 10 seconds, such as at or after 15 seconds, such as at or after 20 seconds, such as at or after 30 second, such as at or after 1 minute of deposition of the water droplet. This time may allow for equilibration due to the ability of the film to absorb water present on the surface of the coated substrate.

Without intending to be limited, the low contact angle may indicate the formation of a water film on the surface rather than water beads. When water beads are present, incident light may be reflected in a diffusive pattern thereby generating the fog-like appearance. Meanwhile, incident light upon hitting a water film can exhibit specular reflection thereby reducing or eliminating the fog-like appearance. Such specular reflection could be due to the hydrophilic, such as superhydrophilic, surface.

Thus, when placed above steam at 100° C. for one minute, there may not be any presence of fogging because of the presence of a water film. This may also be observed when placed immediately above (such as within the steam) of water heated at 60° C. Similarly, when placed in a cold temperature environment (e.g., refrigerator at 1° C. or freezer at −6° C. or −18° C.) for 2 hours and removed to room temperature, there may also not be any presence of fogging because of the presence of the water film. Accordingly, the coated glass may exhibit the desired antifog properties when utilized at room temperature and exposed to a high humidity and/or high temperature environment or when utilized at a cold temperature (e.g., refrigerator at 1° C. or freezer at −6° C. or −18° C.) and exposed to room temperature.

Also, the coated glass may have desired mechanical properties. For instance, the glass may have a cross-hatch adhesion as determined in accordance with ASTM D3359-09 of 3B or higher, such as 4B or higher, such as 5B. The cross-hatch adhesion provides an assessment of the adhesion of the coating to the substrate by applying and removing pressure-sensitive tape over cutes made in the coating. Such cross-hatch rating may be present even after exposing the coated glass to boiling water for ten minutes.

In addition, according to the crock meter test, the coating may exhibit a rating of 3 or less, such as 2 or less, such as 1. The crock meter test provides an indication of the scratch resistance of the coating.

Also, the coating may have a stud pull strength of about 300 pounds per square inch or greater, such as 350 pounds per square inch or greater, such as 400 pounds per square inch or greater, such as about 450 pounds per square inch or greater, such as about 500 pounds per square inch or greater, such as about 600 pounds per square inch or greater, such as about 750 pounds per square inch or more, such as about 1,000 pounds per square inch or more, such as about 1.250 pounds per square inch or more, such as about 1,500 pounds per square inch or more to about 3,000 pounds per square inch or less, such as about 2,500 pounds per square inch or less, such as about 2,000 pounds per square inch or less, such as about 1,750 pounds per square inch or less, such as about 1,500 pounds per square inch or less, such as about 1,250 pounds per square inch or less, such as about 1,000 pounds per square inch or less, such as about 900 pounds per square inch or less, such as about 800 pounds per square inch or less, such as 700 pounds per square inch or less, such as 600 pounds per square inch or less, such as 500 pounds per square inch or less.

Furthermore, the coated glass may exhibit a desired chemical resistance. For instance, the coated glass may pass, suggesting no film failure, the tests when exposed to a 0.1N solution of sodium hydroxide at room temperature for one hour and/or a 5% hydrochloric acid solution at room temperature for one hour. In addition, the coated glass may exhibit the aforementioned cross-hatch ratings even after such exposures. Also, the coated glass may exhibit the aforementioned cross-hatch ratings even after soaking in Windex for 1 hour at room temperature. The cross-hatch ratings may also be present after soaking in deionized water for 1 hour at room temperature.

Various embodiments of the present invention will now be described in more detail below.

A. Glass Substrate

The glass substrate typically has a thickness of from about 0.1 to about 15 millimeters, in some embodiments from about 0.5 to about 10 millimeters, and in some embodiments, from about 1 to about 8 millimeters. The glass substrate may be formed by any suitable process, such as by a float process, fusion, down-draw, roll-out, etc. Regardless, the substrate is formed from a glass composition having a glass transition temperature that is typically from about 500° C. to about 700° C. The composition, for instance, may contain silica ($SiO_2$), one or more alkaline earth metal oxides (e.g., magnesium oxide (MgO), calcium oxide (CaO), barium oxide (BaO), and strontium oxide (SrO)), and one or more alkali metal oxides (e.g., sodium oxide ($Na_2O$), lithium oxide ($Li_2O$), and potassium oxide ($K_2O$)).

$SiO_2$ typically constitutes from about 55 mol. % to about 85 mol. %, in some embodiments from about 60 mol. % to about 80 mol. %, and in some embodiments, from about 65 mol. % to about 75 mol. % of the composition. Alkaline earth metal oxides may likewise constitute from about 5 mol. % to about 25 mol. %, in some embodiments from about 10 mol. % to about 20 mol. %, and in some embodiments, from about 12 mol. % to about 18 mol. % of the composition. In particular embodiments, MgO may constitute from about 0.5 mol. % to about 10 mol. %, in some embodiments from about 1 mol. % to about 8 mol. %, and in some embodiments, from about 3 mol. % to about 6 mol. % of the composition, while CaO may constitute from about 1 mol. % to about 18 mol. %, in some embodiments from about 2 mol. % to about 15 mol. %, and in some embodiments, from about 6 mol. % to about 14 mol. % of the composition. Alkali metal oxides may constitute from about 5 mol. % to about 25 mol. %, in some embodiments from about 10 mol. % to about 20 mol. %, and in some embodiments, from about 12 mol. % to about 18 mol. % of the composition. In particular embodiments, $Na_2O$ may constitute from about 1 mol. % to about 20 mol. %, in some embodiments from about 5 mol. % to about 18 mol. %, and in some embodiments, from about 8 mol. % to about 15 mol. % of the composition.

Of course, other components may also be incorporated into the glass composition as is known to those skilled in the art. For instance, in certain embodiments, the composition may contain aluminum oxide ($Al_2O_3$). Typically, $Al_2O_3$ is employed in an amount such that the sum of the weight percentage of $SiO_2$ and $Al_2O_3$ does not exceed 85 mol. %. For example, $Al_2O_3$ may be employed in an amount from about 0.01 mol. % to about 3 mol. %, in some embodiments from about 0.02 mol. % to about 2.5 mol. %, and in some embodiments, from about 0.05 mol. % to about 2 mol. % of the composition. In other embodiments, the composition may also contain iron oxide ($Fe_2O_3$), such as in an amount from about 0.001 mol. % to about 8 mol. %, in some embodiments from about 0.005 mol. % to about 7 mol. %, and in some embodiments, from about 0.01 mol. % to about 6 mol. % of the composition. Still other suitable components that may be included in the composition may include, for instance, titanium dioxide ($TiO_2$), chromium (III) oxide ($Cr_2O_3$), zirconium dioxide ($ZrO_2$), yttria ($Y_2O_3$), cesium dioxide ($CeO_2$), manganese dioxide ($MnO_2$), cobalt (II, III) oxide ($CO_3O_4$), metals (e.g., Ni, Cr, V, Se, Au, Ag, Cd, etc.), and so forth.

In one embodiment, the glass substrate may be a reflective (e.g., mirrored) glass substrate. That is, the glass substrate has a reflective layer, such as a metallic reflective layer. The reflective layer is not necessarily limited any may be any as generally employed in the art. For instance, the reflective layer may include gold, silver, aluminum, silicon, etc., or any combination thereof. In one embodiment, the reflective layer includes silver. In another embodiment, the reflective layer includes aluminum.

In addition, in one embodiment, the glass substrate may be a laminate. For instance, the laminate may include two glass substrates separated by an intermediate layer. The intermediate layer is not necessarily limited and may be any generally employed in the art. In general, it may be desired to employ an intermediate layer that is also comparably transparent. Such intermediate layer may be employed within the glass substrate in order for the substrate to serve as a safety glass that remains together when shattered. The intermediate layer may include, but is not limited to, an ethylene copolymer (e.g., ethylene vinyl acetate), polyvinyl butyral, polyurethane (e.g., thermoplastic polyurethane), etc.

B. Coating

As indicated, a coating is provided on one or more surfaces of the substrate. For example, the glass substrate may contain first and second opposing surfaces, and the coating may thus be provided on the first surface of the substrate, the second surface of the substrate, or both. In one embodiment, for instance, the coating is provided on only the first surface. In such embodiments, the opposing second surface may be free of a coating or it may contain a different type of coating. Of course, in other embodiments, the coating of the present invention may be present on both the first and second surfaces of the glass substrate. In such embodiments, the nature of the coating on each surface may be the same or different.

Additionally, the coating may be employed such that it substantially covers (e.g., 95% or more, such as 99% or more) the surface area of a surface of the glass substrate. However, it should be understood that the coating may also be applied to cover less than 95% of the surface area of a surface of the glass substrate. For instance, the coating may be applied on the glass substrate in a decorative manner.

The coating may contain any number of different materials. For example, the coating contains at least a binder. The coating may also include, for instance, colorants, light stabilizers, metal alkoxides, nanoparticles, as well as various other types of additives.

i. Binder

As indicated herein, the coating contains a binder. The coating disclosed herein can be produced using the binders disclosed herein. For instance, such binders may be utilized to form a network.

In general, the binder may include a network including a hydrophilic polymer. For instance, the binder may include a polyacrylate, such as a crosslinked polyacrylate. In addition, the binder may include a polyacrylamide, such as a crosslinked polyacrylamide. Further, in one embodiment, the binder may include a silicone, such as one derived from silanes and/or alkoxides. As an example, the network may be one derived from tetraethylorthosilicate. In a further embodiment, the binder may include one including a polyol, such as a melamine-polyol. It should be understood that any of the aforementioned may be utilized alone or in combination for forming the binder.

In one embodiment, the binder may include a combination of the aforementioned hydrophilic polymers. In particular, the binder may include a combination of the polyacrylate, such as the crosslinked polyacrylate, and the polyacrylamide, such as the crosslinked polyacrylamide. In another embodiment, the binder may include the aforementioned in addition to a silicone and polyol, such as a melamine-polyol.

The binder may include an interpenetrating network. In general, an interpenetrating network is a network in which the polymer chains of one polymer or resin are interlocked with those of another polymer or resin such that they may not be separated without breaking any chemical bonds. The binder may include an interpenetrating polymer network of at least two crosslinked polymers. The binder may include a semi-interpenetrating network, for instance one including a linear/branched polymer without any crosslinks. For instance, the binder may include one crosslinked polymer and one non-crosslinked polymer. In another embodiment, the binder may include two crosslinked polymers and one non-crosslinked polymer.

The interpenetrating network can be a fully-interpenetrating network or a semi-interpenetrating network. In one embodiment, the interpenetrating network is a fully-interpenetrating network such that all of the polymers/resins of the network are interlocked. That is, all of the resins of the binder are crosslinked to form the interpenetrating network. In this regard, the polymer chains of at least one respective resin are interlocked with the polymer chains of another respective resin such that they may not be separated without breaking any chemical bonds.

The interpenetrating network can also be a semi-interpenetrating network. In such instance, the network contains at least one crosslinked resin, such as at least two crosslinked resins. That is, at least one resin is crosslinked to form the interpenetrating network. Meanwhile, the polymer chains of the another resin may not be interlocked among the polymer chains of the first crosslinked resin and the second crosslinked resin.

In addition, in one embodiment, the interpenetrating network may include a combination of two organic crosslinked networks. In another embodiment, the interpenetrating network may include a combination of an organic crosslinked network and an inorganic crosslinked network. For instance, at least one of the crosslinked resins may form an organic crosslinked network while at least one of the crosslinked resins may form an inorganic crosslinked resin. By organic crosslinked resin, it is meant that the polymerizable compound is a carbon-based compound. Meanwhile, by inorganic crosslinked resin, it is meant that the polymerizable compound is not a carbon-based compound. For instance, the polymerizable compound may be a silicon-based compound. In one embodiment, the interpenetrating network may include at least two organic crosslinked networks and one inorganic crosslinked network.

Generally, such interpenetrating networks can be synthesized via a formulation containing all of the polymerizable compounds as well as any other reactants, reagents, and/or additives (e.g., initiators, catalysts, etc.) wherein the simultaneous polymerization and crosslinking of the respective resins forms the interpenetrating network. In this regard, the respective crosslinked resins may form at substantially the same time. It should be understood that the aforementioned polymerizable compounds may include individual monomers and oligomers or pre-polymers.

Alternatively, a first crosslinked resin can be formed and provided in a formulation containing other polymerizable compounds for a second crosslinked resin and/or a third resin, such as a third crosslinked resin. In such embodiment, the polymerizable compounds are cured to form a respective network that is interlocked or interlaced with the already formed first crosslinked resin. Even further, a first crosslinked resin and a second crosslinked resin can be formed and provided in a formulation containing other polymerizable compounds for a third crosslinked resin. In such embodiment, the polymerizable compounds are cured to form a respective network that is interlocked or interlaced with the already formed first and second crosslinked resins. In addition, the first crosslinked resin and the second crosslinked resin themselves may form an interpenetrating network or may not form an interpenetrating network until polymerization and crosslinking of the polymerizable compounds of the third crosslinked resin.

An interpenetrating network can also exhibit certain properties that distinguish it from a simple blend of resins. The interpenetrating network may exhibit a glass transition temperature that is between or intermediate the glass transition temperature of any two of the first crosslinked resin, the second crosslinked resin, and the third resin. For instance, the interpenetrating network may have a glass transition temperature of from 0° C. to 300° C., such as from 10° C. to 250° C., such as from 20° C. to 200° C., such as from 30° C. to 180° C. The glass transition temperature may be measured by differential scanning calorimetry according to ASTM E 1356. In addition, for other properties that may exhibit a bimodal distribution or a trimodal distribution due to the presence of a simple mixture of two resins or three resins, respectively, such properties of the interpenetrating network may exhibit a unimodal distribution.

In general, the resins of the binder may be a thermoplastic resin or a thermoset resin. At least one of the resins in the binder is a thermoset resin such that it can be cured/ crosslinked. For instance, by curing, the thermoset resin can become hardened and allow for the formation of a coating. The thermoset resin is generally formed from at least one crosslinkable or polymerizable resin, such as a (meth)acrylic resin, (meth)acrylamide resin, alkyd resin, phenolic resin, amino resin, silicone resin, epoxy resin, polyol resin, etc. As used herein, the term "(meth)acrylic" generally encompasses both acrylic and methacrylic resins, as well as salts and esters thereof, e.g., acrylate and methacrylate resins. In one embodiment, at least two of the resins may be thermoset resins. In one embodiment, two of the resins may be thermoset resins while a third resin may be a thermoplastic resin. In another embodiment, at least three of the resins may be thermoset resins.

The interpenetrating network of the present invention may include at least two crosslinked polymers/resins, such as at least three crosslinked polymers/resins. In one embodiment, the network may include at least four crosslinked polymers/resins. According to the present invention, at least one of these polymers may be a hydrophilic polymer.

The interpenetrating network can include polymers or resins that contribute to the coating having the desired properties. For instance, one polymer or resin may provide hydrophilicity that can provide fast absorption of water when condensed on the surface thereby generating the antifog function. Otherwise, the water may remain on the surface and result in the formation of a thin film of frost. As an example, this polymer or resin may be a polyacrylate as mentioned below. Another polymer or resin may be provided to improve the mechanical strength. As an example, this polymer or resin may be the crosslinked polyol, such as the polyol crosslinked with an amine compound, such as the melamine. Such resin may also impart adhesive properties. For instance, the crosslinking agent, such as melamine, may also react with the glass surface, in particular the hydroxyl groups, in order to attach the crosslinked network to the glass plate. Another polymer or resin may impart hydrophobic properties which may improve the chemical resistance and/or durability. However, it should be understood that while a specific property is indicated, such polymers or resin may also contribute to other properties. For instance, the polyacrylate may also contribute to the mechanical strength of the coating.

i. Hydrophilic Polymer

The binder may include a network formed from a hydrophilic polymer. Such hydrophilic polymer may allow for the absorption of water into the film thereby reducing or eliminating the fogging effect. The hydrophilicity can be due to the polymer itself or can be incorporated into the polymer via a reaction. For instance, the polymer may be reacted with another compound in order to impart the hydrophilicity to the polymer.

In one embodiment, the polymer may be an acrylate. The acrylate resin may be one derived from acrylic acid, methacrylic acid, or a combination thereof. For instance, the acrylate monomer includes, but is not limited to, methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, isobornyl acrylate, 2-hydroxyethyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof.

In one embodiment, the acrylate monomers may be diacrylate monomers. For instance, the acrylate monomers may be diacrylate monomers including, but not limited to, methyl diacrylate, ethyl diacrylate, n-propyl diacrylate, i-propyl diacrylate, n-butyl diacrylate, s-butyl diacrylate, i-butyl diacrylate, t-butyl diacrylate, n-amyl diacrylate, i-amyl diacrylate, isobornyl diacrylate, n-hexyl diacrylate, 2-ethylbutyl diacrylate, 2-ethylhexyl diacrylate, n-octyl diacrylate, n-decyl diacrylate, methylcyclohexyl diacrylate, cyclopentyl diacrylate, cyclohexyl diacrylate, methyl dimethacrylate, ethyl dimethacrylate, 2-hydroxyethyl dimethacrylate, n-propyl dimethacrylate, n-butyl dimethacrylate, i-propyl dimethacrylate, i-butyl dimethacrylate, n-amyl dimethacrylate, n-hexyl dimethacrylate, i-amyl dimethacrylate, s-butyl-dimethacrylate, t-butyl dimethacrylate, 2-ethylbutyl dimethacrylate, methylcyclohexyl dimethacrylate, cinnamyl dimethacrylate, crotyl dimethacrylate, cyclohexyl dimethacrylate, cyclopentyl dimethacrylate, 2-ethoxyethyl dimethacrylate, isobornyl dimethacrylate, etc., as well as combinations thereof.

In one embodiment, the acrylate monomer may include a functional group such that it is a functionalized acrylate monomer. For instance, the functional group may be a hydroxyl, an amine, a carboxyl, or a sulfhydryl. In one particular embodiment, such functional group may be a hydroxyl. In another particular embodiment, such functional group may be an amine. In a further embodiment, such functional group may be a carboxyl. In this regard, when polymerized, the polyacrylate may also have such functional group. Without intending to be limited, such functional group may then allow for crosslinking of the polyacrylate. In this regard, the binder may include a crosslinked polyacrylate.

In general, the acrylate monomers may be aliphatic monomers. For instance, the monomers may be used to form aliphatic oligomers. In this regard, in one embodiment, the aliphatic monomers or oligomers may not contain any aromatic components. However, in one embodiment, the acrylate monomers may also include an aromatic monomer or oligomer.

The monomers may also include any derivatives of the aforementioned. In general, these monomers can be referred to as the polymerizable compounds of the acrylate resins.

In one embodiment, the acrylate resin is made from monomers including the monoacrylates and the diacrylates. In another embodiment, the monomers consist of the diacrylate monomers.

The acrylate resins may also further include a glycidyl functional group. For instance, the acrylate monomer may be a glycidyl group containing acrylate monomer such that the glycidyl group is not part of the backbone but instead imparts functionality to the acrylate monomer.

In general, these acrylate resins can be synthesized according to any method known in the art. The acrylate resins can be formed in one reaction step or in more than one reaction step. If multiple steps are employed, a prepolymer may be formed initially which can then undergo further reactions to synthesize the acrylate resins disclosed herein.

In addition, the glycidyl or epoxy groups of the resins may be crosslinked. Crosslinking may be performed using any method and using any crosslinking agent generally employed in the art. The crosslinking agent may be an amine, an amide, an acrylate, or a combination thereof. In one embodiment, the crosslinking agent may be an amine. In one embodiment, the crosslinking agent may be a diamine, a triamine, or a combination thereof. In another embodiment, the crosslinking agent may be an amide. In a further embodiment, the crosslinking agent may be an acrylate. For instance, the acrylate may be an ethoxylated acrylate, such as an ethoxylated trimethylolpropane triacrylate. Alternatively, or in addition, the acrylate may be a diacrylate, such as an aromatic diacrylate. In an even further embodiment, the crosslinking agent may be an isocyanate, such as a polyisocyanate. In addition, the isocyante crosslinking agent can be aliphatic (e.g., hexamethylene diisocyanate, isophorone diisocyanate, etc.) and/or aromatic (e.g., 2,4 tolylene diisocyanate, 2,6-tolylene diisocyanate, etc.). The reaction can provide urea bonds when reacting with an amine group and urethane bonds when reacting with a hydroxyl group. Without intending to be limited by theory, it is believed that crosslinking can be employed to improve the integrity of the coating.

In addition to an acrylate, the polymer may include, alone or in combination with the acrylate, an acrylamide. The acrylamide may be a methacrylamide or other acrylamide as known in the art. The acrylamide may be an alkylacrylamide (e.g., methacrylamide, dimethacrylamide, ethacrylamide, diethacrylamide, isopropylacrylamide, butylacrylamide, phenylacrylamide, hydroxypropyl methacrylamide, hydroxyphenyl methacrylamide, etc.). The acrylamide may form a polyacrylamide.

Without intending to be limited by theory, the polyacrylamide may undergo hydrolysis. In this regard, the polyacrylamide may have a functional group. For instance, the functional group may be a carboxyl group or a hydroxyl group. In one embodiment, the functional group may be a carboxyl group. In a further embodiment, the functional group may be a hydroxyl group. Without intending to be limited, such functional group may then allow for crosslinking of the polyacrylamide. In this regard, the binder may include a crosslinked polyacrylamide.

The crosslinking agent may also be other compounds as generally known in the art. For instance, such compounds may be isocyanates, carbodiimides (such as polycarbodimides), aziridines or a combination thereof. In one embodiment, the crosslinking agent includes all three of the aforementioned types of compounds. In one particular embodiment, the crosslinking agent includes at least a carbodiimides, such as a polycarbodiimide. In a further embodiment, the crosslinking agent includes at least an aziridine. In an evern further embodiment, the crosslinking agent includes at least an isocyanate. In certain embodiments, the binder may include an acrylate that is crosslinked using a crosslinking agent as disclosed herein.

In general, an initiator (e.g., benzoyl peroxide) can be used to form a free radical which can attack a double bond on a crosslinking agent, monomer or oligomer to form free radicals which can then subsequently attack other monomers or oligomers and form a three dimensional crosslinked network. However, other imitators, such as photoinitiators may also be utilized. These may include a Type I and/or a Type II photoinitiator. For instance, the photoinitiator may be a benzoin ether, a benzilketal, a dialkoxy aceto-phenone, an amino alkyl-phenone, an acyl-phosphine oxide, a benzophenone/amine, a thio-xanthone amine, or a combination thereof. Nonlimiting examples of suitable photoinitiators include acetophenone, anisoin, anthraquinone, anthrqunone-2sulfonic acid-sodium salt monohydrate, tricarbonylchromium, benzyl, benzoin, benzoin ethyl ether, benzoin isobutyl ether, benzophenone, benzophenone/1-hydoxycyclohexyl phenyl ketone, 3,3',4,4'-benzophenonetetracarboxylic, 4-benzoylbiphenyl, 2-benzyl-2-(dimethlamino)-4'-morpholinobutyrophenone, 4,4'-bis(diethylamino) benzophenone, camphorquinone, 2-chlorothiozanthen-9-one, (cumene)cyclopentadienyliron(II) hexafluorophosphate, dibenzosuberenone, 2,2-diethoxyacetophenone, 4,4'-dihydroxybenzophenone, 2,2-dimethoxy-2-phenylacetophenone, 4-(dimetholamino) benzophenone, 4,4'-dimethylbenzil, 2,5-dimenthylbenzophenone, 3,4-dimethylbenzophenone, diphenyl(2,4,6-trimehtylbenzoyl)phosephine oxide/2-hydroxy-2-methylpropiophenone, 4'-ethoxyacetophenone, 2-ethylanthraquinone, ferrocene, 3'-hydroxyacetophenone, 4'-hydroxyacetophenone, 3-hydroxybenzophenone, 4-hydroxybenzophenone, 1-hydroxycyclohexyl phenyl ketone, 2-hydroxy-2-methylproppiophenone, 2-methylbenzophenone, 3-methylbenzophenone, methybenzoylformate, 2-methl-4'-(methylthio)-2-morpholinopropio-phenone, phenanthrenequinone, 4'-phenozyacetophenone, thiozanthen-9-one, triarylsulfonium hexafluoroantimonate salts, triarylsulfonium hexafluorophosphate salt.

Furthermore, such hydrophilic network may be formed using various monomers as disclosed herein. For instance, such monomers may include any acrylate monomers, acrylamide monomers, or a mixture thereof as disclosed herein. In one embodiment, the monomers include at least acrylate monomers. In one particular embodiment, such monomers may include both acrylate monomers and acrylamide monomers. In one embodiment, the formulation may include acrylate monomers with an acrylamide polymer. In one embodiment, the acrylamide may be crosslinked. In another embodiment, the acrylate may be crosslinked. In a further embodiment, the acrylamide and acrylate may both be crosslinked. In one embodiment, the acrylamide may be crosslinked to an acrylate using a crosslinking agent.

The hydrophilic polymer may also include a polysaccharide. For instance, the polysaccharide may be a cellulose (e.g., cellulose esters, cellulose ethers, etc.), starch, chitosan, etc., as well was combinations thereof. Particularly suitable are cellulosic derivatives, such as cellulose esters, cellulose ethers, etc. Examples of cellulose ethers may include, for instance, alkyl cellulose ethers (e.g., methyl cellulose and ethyl cellulose); hydroxyalkyl cellulose ethers (e.g., hydroxyethyl cellulose, hydroxypropyl cellulose, hydroxypropyl hydroxybutyl cellulose, hydroxyethyl hydroxypropyl cellulose, hydroxyethyl hydroxybutyl cellulose, hydroxyethyl hydroxypropyl hydroxybutyl cellulose, etc.); alkyl hydroxyalkyl cellulose ethers (e.g., methyl hydroxyethyl cellulose, methyl hydroxypropyl cellulose, ethyl hydroxyethyl cellulose, ethyl hydroxypropyl cellulose, methyl ethyl hydroxyethyl cellulose and methyl ethyl hydroxypropyl cellulose); carboxyalkyl cellulose ethers (e.g., carboxymethyl cellulose); and so forth, as well as protonated salts of any of the foregoing, such as sodium carboxymethyl cellulose. Likewise, examples of cellulose esters may include, for instance, $C_1$-$C_{20}$ esters of cellulose, in some embodiments $C_2$-$C_{20}$ esters of cellulose, and in some embodiments, $C_2$-$C_{10}$ esters of cellulose, such as cellulose acetate, cellulose triacetate, cellulose acetate phthalate, cellulose acetate butyrate, cellulose butyrate, cellulose tributyrate, cellulose propionate, cellulose tripropionate, cellulose acetate propionate, carboxymethylcellulose acetate, carboxymethylcellulose acetate propionate, carboxymethylcellulose acetate butyrate, cellulose acetate butyrate succinate, cellulose propionate butyrate, etc., as well as combinations thereof.

ii. Sol-Gel Coating

In one embodiment, the binder may include a resin or network formed via sol-gel. For instance, such binder may be a silicon-containing resin. The silicon-containing resin may be a polysiloxane resin. In particular, the polysiloxane resin may be a polysilsesquioxane resin. In general, such a silicon-containing resin can be formed using any method generally known in the art. For instance, the silicon-containing resin can be formed by reacting organosilicon compounds, such as organosilane compounds. That is, the organosilicon compounds, such as the organosilane compounds, can be referred to as the polymerizable compounds of the silicon-containing resin.

These organosilicon compounds may include organosilane compounds, such as alkylsilanes including substituted alkyl silanes. The organosilicon compounds may also include organoalkoxysilanes, organofluorosilanes, etc. In this regard, the organosilicon compounds may include a combination of alkylsilane compounds and organoalkoxysilane compounds.

For instance, the binder may be formed from a metal and/or non-metal alkoxide compound. In particular, such alkoxides may be employed to form a polymerized (or condensed) alkoxide coating. For instance, the compounds may undergo a hydrolysis reaction and a condensation reaction. Then, the solvent is removed by heating or other means to provide the coating.

Generally, an alkoxide may have the following general formula

$$M^{x+}(OR)^-_x$$

wherein, x is from 1 to 4;

R is an alkyl or cycloalkyl; and

M is a metal or a non-metal cation.

While R, M, and x may be generally selected accordingly, in certain embodiments, they may be selected according to the following.

As indicated above, "x" may be from 1 to 4. However, "x" may be selected based upon the valence of the chosen metal or non-metal cation. As indicated above, "x" may be 1, 2, 3, or 4. In one embodiment, "x" is 1 while in other embodiments, "x" may be 2. In another embodiment, "x" may be 3 while in another embodiment "x" may be 4.

Similarly, "R" may be selected based upon the desired characteristics, including the desired stereospecificity of the resulting alkoxide. For instance, "R" may be an alkyl or cycloalkyl. In this regard, such alkyl may be $C_1$ or greater, such as a $C_1$-$C_6$, such as a $C_1$-$C_3$, such as a $C_2$-$C_3$. Meanwhile, such cycloalkyl may be $C_3$ or greater, such as a $C_3$-$C_6$, such as a $C_4$-$C_6$, such as a $C_4$-$C_5$. When "R" is an alkyl, "R" may be selected to be a methyl, ethyl, butyl, propyl, or isopropyl group. In one embodiment, "R" may be a propyl group, such as an isopropyl group. When R is a cycloalkyl, "R" may be a cyclopropyl, cyclobutyl, cyclopentyl, or cyclohexyl group.

As indicated above, "M" may be a metal cation or a non-metal cation. In one embodiment, "M" may be a metal cation. The metal may be a Group IA, IIA, IIIA, IVA, VA, VIA, IB, IIB IIIB, IVB, VB, VIB, VIIB, or VIIIB metal. For instance, "M", while not necessarily limited to the following, may be aluminum, cobalt, copper, gallium, germanium, hafnium, iron, lanthanum, molybdenum, nickel, niobium, rhenium, scandium, silicon, sodium, tantalum, tin, titanium, tungsten, or zirconium. In one particular embodiment, "M" may be copper, aluminum, zinc, zirconium, silicon or titanium. In one embodiment, "M" may include any combination of the aforementioned. For instance, the alkoxide may include a combination of alkoxides including copper, aluminum, zinc, zirconium, silicon and titanium. In one embodiment, "M" may include at least silicon. In another embodiment, "M" may be a non-metal cation, such as a metalloid as generally known in the art.

In yet further embodiments, alkoxides may be selected according to the following exemplary embodiments. For example, exemplary alkoxides may include Cu(OR), Cu(OR)$_2$, Al(OR)$_3$, Zr(OR)$_4$, Si(OR)$_4$, Ti(OR)$_4$, and Zn (OR)$_2$, wherein R is a C$_1$ or greater alkyl group. For instance, the metal alkoxide may include, but is not limited to, aluminum butoxide, titanium isopropoxide, titanium propoxide, titanium butoxide, zirconium isopropoxide, zirconium propoxide, zirconium butoxide, zirconium ethoxide, tantalum ethoxide, tantalum butoxide, niobium ethoxide, niobium butoxide, tin t-butoxide, tungsten (VI) ethoxide, germanium, germanium isopropoxide, hexyltrimethoxysilane, tetraethoxysilane, and so forth, and in a more particular embodiment may be titanium isopropoxide, zirconium n-propoxide, aluminum s-butoxide, copper propoxide, and/or tetraethoxysilane.

In particular, the alkoxide compound may be an organoalkoxysilane compound. Examples of organoalkoxysilane compounds include those having the following general formula:

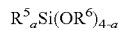

wherein, a is from 0 to 3, and in some embodiments, from 0 to 1;

R$^5$ is an alkyl, alkenyl, aryl, heteroaryl, cycloalkyl, heterocyclyl, halo, or haloalkyl; and R$^6$ is an alkyl.

In certain embodiments, "a" is 0 such that that the organosilane compound is considered an organosilicate. One example of such a compound is tetraethyl orthosilicate (Si(OC$_2$H$_5$)$_4$). In other embodiments, "a" is 1 such that the organosilane compound is considered a trialkoxysilane compound. In one embodiment, for instance, R$^5$ in the trialkoxysilane compound may be an alkyl, aryl, or haloalkyl (e.g., fluoroalkyl). Such group may have at least 1 carbon atom, such as at least 2 carbon atoms, such as at least 3 carbon atoms and may have 25 carbon atoms or less, such as 20 carbon atoms or less, such as 10 carbon atoms or less, such as 5 carbon atoms or less. Several examples of such trialkoxysilane compounds include, for instance, ethyltrimethoxysilane (CH$_3$CH$_2$Si(OCH$_3$)$_3$), ethyltriethoxysilane (CH$_3$CH$_2$Si(OCH$_2$CH$_3$)$_3$), phenyltrimethoxysilane (phenyl-(OCH$_3$)$_3$), phenyltriethoxysilane (phenyl-(OCH$_2$CH$_3$)$_3$), hexyltrimethoxysilane (CH$_3$ (CH$_2$)$_5$Si(OCH$_3$)$_3$), hexyltriethoxylsilane (CH$_3$ (CH$_2$)$_5$Si(OCH$_2$CH$_3$)$_3$), heptadecapfluoro-1,2,2-tetrahydrodecyltrimethoxysilane (CF$_3$ (CF$_2$)$_7$ (CH$_2$)$_2$Si(OCH$_3$)$_3$), 3-glycidoxypropyltrimethoxysilane (CH$_2$ (O)CH—CH$_2$O—(CH$_2$)$_3$—Si(OCH$_3$)$_3$), etc., as well as combinations thereof.

In one embodiment, the silicon-containing resin is made from organosilicon compounds consisting of the organoalkoxysilane compounds as mentioned above.

Any of a variety of curing mechanisms may generally be employed to form the silicon-containing resin. For instance, the alkoxysilanes can undergo a hydrolysis reaction to convert the OR6 groups into hydroxyl groups. Thereafter, the hydroxyl groups can undergo a condensation reaction to form a siloxane functional group. In general, reactions may occur via an SN2 mechanism in the presence of an acid. For instance, silanes may be hydrolyzed and then condensed to form the crosslinked network. In addition, the hydrolyzed silanes may also react with silica particles, such as silica nanoparticles, when employed.

To initiate the reaction, the organosilane compound may initially be dissolved in a solvent to form a solution. Particularly suitable are organic solvents, such as hydrocarbons (e.g., benzene, toluene, and xylene); ethers (e.g., tetrahydrofuran, 1,4-dioxane, and diethyl ether); ketones (e.g., methyl ethyl ketone); halogen-based solvents (e.g., chloroform, methylene chloride, and 1,2-dichloroethane); alcohols (e.g., methanol, ethanol, isopropyl alcohol, and isobutyl alcohol); and so forth, as well as combinations of any of the foregoing. Alcohols are particularly suitable for use in the present invention. The concentration of the organic solvent within the solution may vary, but is typically employed in an amount of from about 70 wt. % to about 99 wt. %, in some embodiments from about 80 wt. % to about 98 wt. %, and in some embodiments, from about 85 wt. % to about 97 wt. % of the solution. Organosilane compounds may likewise constitute from about 1 wt. % to about 30 wt. %, in some embodiments from about 2 wt. % to about 20 wt. %, and in some embodiments, from about 3 wt. % to about 15 wt. % of the solution.

Examples of alkylsilane compounds include those having the following general formula:

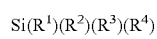

wherein,

R$^1$, R$^2$, R$^3$, and R$^4$ are an alkyl.

As indicated above, R$^1$, R$^2$, R$^3$, and R$^4$ are an alkyl. For instance, the alkyl may have at least 1 carbon atom, such as at least 2 carbon atoms, such as at least 3 carbon atoms and may have 25 carbon atoms or less, such as 20 carbon atoms or less, such as 10 carbon atoms or less, such as 5 carbon atoms or less. Each group may be the same alkyl group or a different alkyl. For instance, in one embodiment, each group may be the same alkyl group. In one embodiment, at least three of the R groups may be the same alkyl group, such as a methyl group. In another embodiment, at least two of the R groups may be the same alkyl group, such as a methyl group. It should be understood that the alkyl groups may be substituted alkyl groups. Several examples of such compounds include, for instance, ethyltrimethylsilane (CH$_3$CH$_2$Si(CH$_3$)$_3$), ethyltriethylsilane (CH$_3$CH$_2$Si (CH$_2$CH$_3$)$_3$), phenyltrimethylsilane (phenyl-Si(CH$_3$)$_3$), phenyltriethylsilane (phenyl-Si(CH$_2$CH$_3$)$_3$), hexyltrimethylsilane (CH$_3$(CH$_2$)$_5$Si(CH$_3$)$_3$), hexyltriethylsilane (CH$_3$ (CH$_2$)$_5$Si(CH$_2$CH$_3$)$_3$), etc., as well as combinations thereof.

iii. Polyol Resin

In one embodiment, the binder may contain a crosslinked polyol resin. The crosslinked polyol resin can be obtained by reacting or crosslinking polyols. In general, polyols contain two or more hydroxyl groups (i.e., defined as an —OH group wherein the —OH group of a carboxyl group is not considered a hydroxyl group). In general, polyols can be non-polymeric polyols or polymeric polyols. Examples of such polyols may include, for instance, a diol compound, a polyether polyol, a polyester polyol, a polycarbonate polyol, a polyacrylate polyol, a polyurethane polyol, a polysiloxane polyol, a phenolic polyol, a sugar alcohol, a dendritic polyol, and so forth. In one embodiment, the polyol may be a diol compound, a polyether polyol, a sugar alcohol, and/or a dendritic polyol. However, it should be understood that the polyol may not be limited to the aforementioned and may include any polyol known in the art that can be polymerized and/or crosslinked.

As indicated above, the polyol may include a diol compound. For instance, the polyol may be an ethylene glycol, diethylene glycol, propylene glycol, dipropylene glycol, butanediol, pentanediol, hexanediol, heptanediol, octanediol, nonanediol, decanediol, etc. While the aforementioned are diol compounds containing two hydroxyl groups, it should be understood that compounds containing additional hydroxyl groups may also be employed.

In one embodiment, the polyol may include a polyether polyol. The polyether polyol may include an ethoxylation or a propoxylation product of water or a diol. The polyether polyol may be polyethylene glycol, polypropylene glycol, or a combination thereof. In one embodiment, the polyether polyol may be polyethylene glycol. In another embodiment, the polyether polyol may be polypropylene glycol. For instance, the propylene glycol may be a monopropylene glycol, dipropylene glycol and/or a tripropylene glycol.

Additionally, the polyol may include a polyester polyol. The polyester polyol may be made by a polycondensation reaction of an acid or corresponding anhydride with a polyhydric alcohol. Suitable acids for example include, but are not limited to, benzoic acid, maleic acid, adipic acid, phthalic acid, isophthalic acid, terephthalic acid and sebacic acid as well as their corresponding anhydrides, and dimeric fatty acids and trimeric fatty acids and short oils. Suitable polyhydric alcohols include, but are not limited to, ethylene glycol, propylene glycol, diethylene glycol, 1,4-butanediol, 1,6-hexane diol, 2,2-dimethyl-1,3-propanediol, neopentyl glycol, tetraethylene glycol, polycarbonate diols, trimethylolethane, trimethylolpropane, glycerol, 1,4-cyclohexanediol, 1,4-cyclohexanedimethanol, and glycerol.

In another embodiment, the polyol may include a polyacrylate polyol. The polyacrylate polyol may be made by a copolymerization reaction of a hydroxyalkyl(meth)acrylate monomer, such as, for example, a hydroxy $C_1$-$C_8$ alkyl (meth)acrylate, with an acrylate monomer, such as, for example, a $C_1$-$C_{10}$ alkyl acrylate and a cyclo $C_6$-$C_{12}$ alkyl acrylate, or with a methacrylate monomer, such as, for example, a $C_1$-$C_{10}$ alkyl methacrylate and a cyclo $C_6$-$C_{12}$ alkyl methacrylate, or with a vinyl monomer, such as, for example, styrene, α-methylstyrene, vinyl acetate, vinyl versatate, or with a mixture of two or more of such monomers. Suitable hydroxyalkyl(meth)acrylate monomers include for example, hydroxyethyl acrylate, hydroxypropyl acrylate, hydroxyethyl methacrylate, hydroxypropyl methacrylate. Suitable alkyl (meth)acrylate monomers include, for example, methyl methacrylate, ethyl methacrylate, butyl methacrylate, butyl acrylate, ethylhexyl methacrylate, isobornyl methacrylate. Suitable polyacrylate polyols include, for example, hydroxy($C_2$-$C_8$)alkyl (meth)acrylate-co-($C_2$-$C_8$)alkyl (meth)acrylate copolymers.

The polyol may also include a sugar alcohol. For instance, the sugar alcohol may be a sucrose based alcohol. For instance, the polyol may be a sorbitol or a sorbitol based polyol. The sorbitol may be an ethoxylated and/or propoxylated sorbitol.

In a further embodiment, the polyol may be a dendritic polyol. Like other polyols, the dendritic polyols contain reactive hydroxyl groups with can react with other functional groups. Generally, such dendritic polyols can offer a large number of primary hydroxyl groups along a densely branched polymer backbone. The dendritic polyol may be a carbon based dendritic polyol or a silicon based dendritic polyol or a combination thereof. That is, the base polyol utilized for the formation of the dendritic polyol may include carbon, silicon, or a combination thereof. In one embodiment, the base polyol includes carbon. In another embodiment, the base polyol includes a combination of a silicon and carbon (i.e., a carbosilane). However, it should be understood that the base polyol may also include other atoms, such as another oxygen atom outside of the hydroxyl group.

In addition, to form the dendritic polyol, the base polyol should be a branched structure. For instance, from a central atom, there should be at least three, such as at least four substituent groups or branches that extend therefrom and allow the formation of a dendritic structure. In addition, the dendritic polyol may have an average degree of branching of more than zero and less than or equal to 1, such as from 0.2 to 0.8. Generally, according to definition, strictly linear polyols have a degree of branching of zero and ideally dendritic polyols have a degree of branching of 1.0. The average degree of branching may be determined by $^{13}$C-NMR spectroscopy.

In addition, the dendritic polyol may be a polyether polyol and/or a polyester polyol. In one embodiment, the dendritic polyol may be a polyether polyol. In another embodiment, the dendritic polyol may be a polyester polyol. In another embodiment, the dendritic polyol may be a combination of a polyether poly and a polyester polyol.

The dendritic polyol has at least 2, such as at least 3, such as at least 4, such as at least 5, such as at least 6, such as at least 8, such as at least 10, such as at least 15, such as at least 20, such as at least 30, such as at least 50, such as at least 100 terminal hydroxyl groups to 1000 or less, such as 500 or less, such as 100 or less, such as 75 or less, such as 50 or less, such as 25 or less, such as 15 or less, such as 10 or less terminal hydroxyl groups. The dendritic polyol has a molecular weight of at least 500 g/mol, such as at least 1,000 g/mol, such as at least 1,500 g/mol, such as at least 2,000 g/mol, such as at least 2,500 g/mol, such as at least 3,000 g/mol, such as at least 4,000 g/mol, such as at least 5,000 g/mol, such as at least 6,000 g/mol, such as at least 10,000 g/mol to 100,000 g/mol or less, such as 75,000 g/mol or less, such as 50,000 g/mol or less, such as 25,000 g/mol or less, such as 15,000 g/mol or less, such as 10,000 g/mol or less, such as 7,500 g/mol or less, such as 6,000 g/mol or less, such as 5,000 g/mol or less. While not necessarily limited, the dendritic polyol may be any of those available under the name Boltorn™.

When such dendritic polyols are employed, crosslinked networks can be obtained. For instance, crosslinked networks can be obtained via a condensation reaction with any silanes, in particular hydrolyzed silanes present in the formulation. In addition, reactions may occur with a melamine resin. In this regard, the dendritic polyol may serve as a crosslinking agent. In particular, a carbocation intermediate may be formed in the melamine resin. Thereafter, condensation may occur between the melamine resin and the dendritic polyol. Such reactions may occur via SN1 mechanisms. In addition to such reactions, the dendritic polyol may also react with the glass substrate. That is, the dendritic polyol may react with hydroxyl groups present on the glass substrate. Such reaction may improve the adhesive strength of the coating on the glass substrate thereby resulting in improved stud pull and cross-hatch properties.

Any of a variety of curing mechanisms may generally be employed to form the crosslinked polyol resin. In certain embodiments, for instance, a crosslinking agent may be employed to help facilitate the formation of crosslink bonds. For example, an isocyanate crosslinking agent may be employed that can react with amine or hydroxyl groups on the polyol polymerizable compound. The isocyanate crosslinking agent can be a polyisocyanate crosslinking agent. In addition, the isocyante crosslinking agent can be aliphatic (e.g., hexamethylene diisocyanate, isophorone diisocyanate, etc.) and/or aromatic (e.g., 2,4 tolylene diisocyanate, 2,6- tolylene diisocyanate, etc.). The reaction can provide urea bonds when reacting with an amine group and urethane bonds when reacting with a hydroxyl group. In this regard, the crosslinked polymer or resin may be a polyurethane.

In yet another embodiment, a melamine crosslinking agent may be employed that can react with hydroxyl groups on the polyol polymerizable compound to form the crosslink bonds. Suitable melamine crosslinking agents may include, for instance, resins obtained by addition-condensation of an amine compound (e.g., melamine, guanamine, or urea) with formaldehyde. Particularly suitable crosslinking agents are fully or partially methylolated melamine resins, such as hexamethylol melamine, pentamethylol melamine, tetramethylol melamine, etc., as well as mixtures thereof. Such reactions can provide ether bonds when reacting a hydroxyl group of the polyol polymerizable compound with a hydroxyl group of the amine (e.g., melamine) crosslinking agent. Without intending to be limited by theory, melamine can react with various functional groups (e.g., carboxyl, hydroxyl, glycidyl, etc.) and such reactions may allow for further crosslinking which can in turn result in improved abrasion resistance. The melamine may be a hexamethoxy methylmelamine. When the crosslinking agent is a melamine, the crosslinked polymer or resin may be a melamine-polyol resin.

In one embodiment, the crosslinked polyol resin may include urethane bonds formed by the polyol and the crosslinking agent. In this regard, the polyol is crosslinked with an isocyanate crosslinking agent. Such resin may be a polyurethane. In another embodiment, the crosslinked polyol resin may include ether bonds formed by the polyol and the crosslinking agent. In this regard, the polyol is crosslinked with an amine crosslinking agent containing hydroxyl groups, such as a melamine-formaldehyde crosslinking agent. Such resin may be a melamine-polyol resin. In another embodiment, the binder and network may include at least two crosslinked polyol resins. For instance, the network may include the aforementioned polyurethane and melamine-polyol resin.

In general, reactions may occur via an SN1 mechanism in the presence of an acid catalyst (e.g., p-toluene sulfonic acid). For instance, when a melamine formaldehyde crosslinking agent is employed, a proton can be attacked by an oxygen atom (in —CH$_2$OCH$_3$) located in the melamine formaldehyde to generate a carbocation intermediate with —CH$_3$OH remaining as the by-product. Then, the nucleophilic oxygen in the polyol can attack the electrophilic carbocation intermediate to create a chemical bond between the melamine-formaldehyde and the polyol.

iv. Other Polymers

In one embodiment, the binder may also contain an epoxy resin. In general, such an epoxy resin can be formed using any method generally known in the art. The epoxy resins can be synthesized from any compounds that contain an epoxy component. Such compounds may include at least one epoxide functional group, such as at least two epoxide functional groups. In general, an epoxy compound is a compound that includes epoxide groups and may be reacted or cross-linked. These compounds containing the epoxide functional groups can be referred to as the polymerizable compounds of the epoxy resins.

Suitable epoxy resins include, but are not limited to, epoxy resins based on bisphenols and polyphenols, such as, bisphenol A, tetramethylbisphenol A, bisphenol F, bisphenol S, tetrakisphenylolethane, resorcinol, 4,4'-biphenyl, dihydroxynaphthylene, and epoxy resins derived from novolacs, such as, phenol:formaldehyde novolac, cresol:formaldehyde novolac, bisphenol A novolac, biphenyl-, toluene-, xylene-, or mesitylene-modified phenol:formaldehyde novolac, aminotriazine novolac resins and heterocyclic epoxy resins derived from p-amino phenol and cyanuric acid. Additionally, aliphatic epoxy resins derived from 1,4-butanediol, glycerol, and dicyclopentadiene skeletons, are suitable. Examples of heterocyclic epoxy compounds are diglycidylhydantoin or triglycidyl isocyanurate.

In certain embodiments, the epoxy resins may include a diglycidyl ether. For instance, the epoxy resins may be non-aromatic hydrogenated cyclohexane dimethanol and diglycidyl ethers of hydrogenated Bisphenol A-type epoxide resin (e.g., hydrogenated bisphenol A-epichlorohydrin epoxy resin), cyclohexane dimethanol. Other suitable non-aromatic epoxy resin may include cycloaliphatic epoxy resins.

Additionally, the epoxy compound may be a combination of an epoxy compound and an acrylate compound. For instance, such compound may be an epoxy acrylate oligomer, such as an epoxy diacrylate, an epoxy tetraacrylate, or a combination thereof. For example, such compound may be a bisphenol A epoxy diacrylate, bisphenol A epoxy tetraacrylate, or a combination thereof. Such acrylate may be any of those referenced herein. For instance, the compound may be a bisphenol A epoxy dimethacrylate or a bisphenol A epoxy tetramethacrylate. Such oligomers may also be modified to include a substituent group. For instance, such substituent group may include an amine, a carboxyl group (e.g., a fatty acid), etc.

In addition, the epoxy groups of the resins may be crosslinked using any method and using any crosslinking agent generally employed in the art. The crosslinking agent may be an amine, an amide, an acid, a phenol, an alcohol, etc. In one embodiment, the crosslinking agent may be an amine. In one embodiment, the crosslinking agent may be a diamine, a triamine, or a combination thereof. In another embodiment, the crosslinking agent may be an amide. In one embodiment, the crosslinking agent may be an acrylate, such as a diacrylate or a triacrylate. In general, an initiator (e.g., benzoyl peroxide) can be used to form a free radical which can attack a double bond on a crosslinking agent or oligomer to form monomeric free radicals which can then subsequently attack other oligomers and form a three dimensional crosslinked network.

Without intending to be limited by theory, it is believed that crosslinking can be employed to improve the integrity of the coating.

In addition to the above, the binder may also include other resins. For instance, as mentioned above, the resin or polymer may be a thermoplastic. In particular, the fourth polymer may be any polymer that can be introduced into the network of the binder. In particular, the fourth resin may be one that can thermally decompose to release monomers during decomposition and allow for the reduction of bubbles. These polymers can include polymethacrylonitrile, a polystyrene (e.g., poly(styrene-co-methyl methacrylate, poly(α-methylstyrene), poly(p-bromostyrene), poly(p-chlorostyrene), poly(p-methoxystyrene), poly(p-methylstyrene), poly(deuterostyrene), poly(trifluorostyrene), etc.), polyoxymethylene, polytetrafluoroethylene, polycarbonate (e.g., polypropylene carbonate, polyethylene carbonate, etc.), polyglycol (e.g., polyethylene glycol, polyethylene glycol-propylene glycol-ethylene glycol, polypropylene glycol, etc.), and etc. In one embodiment, the fourth resin includes a poly(styrene-co-methyl methacrylate) copolymer. In this regard, such fourth resin may be a linear polymer. For instance, the fourth resin may be one that is not crosslinked.

v. Network Formation

In general, the crosslinked resins may form crosslinks with itself. That is, for example, the polyol resin is formed by reacting a polyol with a crosslinking agent. The silicone resin can be formed by reacting silicone-containing compounds. However, in one embodiment, one resin may form covalent bonds with another resin. For instance, a polyacrylate may form crosslinks with a polyacrylamide. As another example, the polyol resin may also have some covalent bonds with another resin, such as the silicon-containing resin. In addition, silica particles, such as silica nanoparticles, when employed, can also be used to react with the polyol resin to introduce nanoparticles into the crosslinked polyol resin.

Each resin independently of one another may be present in an amount of greater than 0 wt. %, such as about 1 wt. % or more, such as about 2 wt. % or more, such as about 5 wt. % or more, such as about 7 wt. % or more, such as about 10 wt. % or more, such as about 20 wt. % or more, such as about 25 wt. % or more, such as about 30 wt. % or more, such as about 40 wt. % or more to less than 100 wt. %, such as about 90 wt. % or less, such as about 75 wt. % or less, such as about 60 wt. % or less, such as about 50 wt. % or less, such as about 40 wt. % or less, such as about 30 wt. % or less, such as about 25 wt. % or less, such as about 20 wt. % or less, such as about 10 wt. % or less based on the total weight of the binder resins. That is, the resin may be present in any of the aforementioned concentrations based on the total weight of the binder resins.

The binder may constitute about 1 wt. % or more, such as about 2 wt. % or more, such as about 3 wt. % or more, such as about 5 wt. % or more, such as about 10 wt. % or more, such as 20 wt. % or more, such as about 40 wt. % or more, such as 60 wt. % or more, such as about 80 wt. % or more of the coating. The binder may constitute 100 wt. % or less, such as 90 wt. % or less, such as 70 wt. % or less, such as 50 wt. % or less, such as 30 wt. % or less, such as 20 wt. % or less, such as about 15 wt. % or less, such as about 12 wt. % or less, such as about 11 wt. % or less, such as about 10 wt. % or less of the coating. Such concentration may be for a coating after curing and prior to tempering.

A variety of different techniques may generally be employed to form the coating and in particular the binder comprising the interpenetrating network. In general, a coating formulation is applied to a surface of the glass substrate. The coating formulation contains polymerizable compounds (e.g., monomers, oligomers and/or pre-polymers). The coating formulation may also contain any other optional additives (e.g., pigments, light stabilizers, nanoparticles, surfactants, crosslinking agents, initiators such as photoinitiators, etc.).

In general, the coating formulation contains a first polymerizable compound. The coating formulation may also contain a second polymerizable compound. Further, the coating formulation may also contain a third polymerizable compound. As an example, in one embodiment, the first polymerizable compound comprises a polymerizable polyol. The coating formulation may also contain a crosslinking agent. For instance, the crosslinking agent may be an isocyanate. The crosslinking agent may alternatively be an amine crosslinking agent (e.g., a melamine crosslinking agent and in particular a melamine-formaldehyde crosslinking agent). In one embodiment, the second polymerizable compound may be an organoalkoxysilane. In one embodiment, the third polymerizable compound may be an acrylate. In one embodiment, another polymerizable polyol may be employed with an isocyanate crosslinking agent.

In another embodiment, the first polymerizable compound may be an acrylate. The coating formulation may also contain a crosslinking compound. For instance, the crosslinking compound may be a diacrylate and/or a triarylate. In addition, the second polymerizable compound may be an acrylamide. The coating formulation may include a further crosslinking compound, such as a carbodiimide and in particular a polycarbodiimide. Even further, the coating formulation may also include a photoinitiator.

Once applied to the substrate, the coating formulation can be cured. Such curing can provide a first crosslinked resin. For instance, when the first polymerizable compound comprises a polymerizable polyol, the first crosslinked resin comprises a crosslinked polyol. In addition, such curing can also provide a second crosslinked resin such that the first crosslinked resin and the second crosslinked resin form an interpenetrating network. Further, the third polymerizable compound may also be polymerized. In one embodiment, such compound may also form a crosslinked resin that forms an interpenetrating network the first crosslinked resin and/or the second crosslinked resin.

In one embodiment, at least one of the resins may be crosslinked before application to a surface of a glass substrate. That is, the coating formulation or composition may contain at least one crosslinked resin. In addition, the coating formulation may contain a second crosslinked resin and/or a third crosslinked resin. Alternatively, the coating formulation or composition may contain a second polymerizable compound and/or a third polymerizable compound. For instance, the coating formulation or composition may contain a second crosslinked resin and a third polymerizable compound. Or, the coating formulation or composition may contain a second polymerizable compound and a third crosslinked resin.

In one embodiment, the interpenetrating network may be formed and then combined with any other components (e.g., pigments, etc.). In this case, the composition containing the interpenetrating network and the resins (e.g., at least first crosslinked polyol resin, second crosslinked resin, and third resin) and the glass frit can be applied to a surface of a glass substrate. Prior to application, the composition may be ground for example using a ball mill.

Furthermore, one coating formulation may be applied to the substrate to form a first coating layer. Thereafter, a second coating formulation may be applied to the first coating layer to form a second coating layer. For example, the at least one coating layer may be formed from a hydrophilic polymer, such as a polyacrylate and/or a polyacrylamide. Meanwhile, the other coating layer may be formed including a polyol resin, a silicon resin, and/or a hydrophilic polymer.

In addition, the coating formulation may also contain one or more organic solvents. Any solvent capable of dispersing or dissolving the components may be suitable, such as alcohols (e.g., ethanol or methanol); dimethylformamide, dimethyl sulfoxide, hydrocarbons (e.g., pentane, butane, heptane, hexane, toluene and xylene), ethers (e.g., diethyl ether and tetrahydrofuran), ketones and aldehydes (e.g., acetone and methyl ethyl ketone), acids (e.g., acetic acid and formic acid), and halogenated solvents (e.g., dichloromethane and carbon tetrachloride), and so forth. Although the actual concentration of solvents employed will generally depend on the components of the formulation and the substrate on which it is applied, they are nonetheless typically present in an amount from about 1 wt. % to about 40 wt. %, in some embodiments from about 5 wt. % to about 35 wt. %, and in some embodiments, from about 10 wt. % to about 30 wt. % of the formulation (prior to drying).

In addition, the coating formulation may contain any other conventional additives as employed in the art. For instance, such additives may be employed to facilitate dispersion of the components and/or assist in formation of the coating. For instance, the coating formulation may contain an initiator and/or a catalyst, such as an acid catalyst. Examples of such acid catalysts may include, for instance, acetic acid, sulfonic acid, nitric acid, hydrochloric acid, malonic acid, glutaric acid, phosphoric acid, etc., as well as combinations thereof. When employed, initiators and/or acid catalysts typically constitute from about 0.001 wt. % to about 2 wt. %, in some embodiments from about 0.005 wt. % to about 1 wt. %, in some embodiments, from about 0.01 wt. % to about 0.5 wt. % of the formulation, and in some embodiments from about 0.1 wt. % to about 0.25 wt. %.

The coating formulation may contain a surfactant. The surfactant is not necessarily limited and may be any surfactant generally known in the art. The surfactant may be a discrete compound as generally known in the art. In addition, the surfactant may be an oligomeric or polymerizable surfactant as generally known in the art.

The surfactant may be an anionic surfactant, a cationic surfactant, and/or a non-ionic surfactant. For instance, in one embodiment, the surfactant may be a non-ionic surfactant. The non-ionic surfactant may be an ethoxylated surfactant, a propoxylated surfactant, an ethoxylated/propoxylated surfactant, polyethylene oxide, an oleate (e.g., sorbitan monooleate, etc.), fatty acid ester or derivative thereof, an alkyl glucoside, a sorbitan alkanoate or a derivative thereof, a combination thereof, etc. In one embodiment, the surfactant may be a functional surfactant, for instance one having a functional group or a carbon-carbon double bond. Such functionality can allow for crosslinking of the surfactant with a polymer in the interpenetrating network.

As indicated above, in one embodiment, the coating solution may include an anionic surfactant. In general, anionic surfactants include those having one or more negatively charged functional groups. For instance, the anionic surfactant includes alkali metal or ammonium salts of alkyl, aryl or alkylaryl sulfonates, sulfates, phosphates. For instance, the anionic surfactant may include sodium lauryl sulfate, sodium octylphenol glycolether sulfate, sodium dodecylbenzene sulfonate, sodium lauryldiglycol sulfate, ammonium tritertiarybutyl phenol and penta- and octa-glycol sulfonates, sulfosuccinate salts such as disodium ethoxylated nonylphenol half ester of sulfosuccinic acid, disodium n-octyldecyl sulfosuccinate, sodium dioctyl sulfosuccinate, and mixtures thereof. Other examples include a $C_8$-$C_{22}$ alkyl fatty acid salt of an alkali metal, alkaline earth metal, ammonium, alkyl substituted ammonium, for example, isopropylamine salt, or alkanolammonium salt.

In one particular embodiment, the anionic surfactant includes a water-soluble salt, particularly an alkali metal salt, of an organic sulfur reaction product having in their molecular structure an alkyl radical containing from about 8 to 22 carbon atoms and a radical selected from the group consisting of sulfonic and sulfuric acid ester radicals. Organic sulfur based anionic surfactants include the salts of $C_{10}$-$C_{16}$ alkylbenzene sulfonates, $C_{10}$-$C_{22}$ alkane sulfonates, $C_{10}$-$C_{22}$ alkyl ether sulfates, $C_{10}$-$C_{22}$ alkyl sulfates, $C_4$-$C_{10}$ dialkylsulfosuccinates, $C_{10}$-$C_{22}$ acyl isothionates, alkyl diphenyloxide sulfonates, alkyl naphthalene sulfonates, and 2-acetamido hexadecane sulfonates. Organic phosphate based anionic surfactants include organic phosphate esters such as complex mono- or diester phosphates of hydroxyl-terminated alkoxide condensates, or salts thereof. Included in the organic phosphate esters are phosphate ester derivatives of polyoxyalkylated alkylaryl phosphate esters, of ethoxylated linear alcohols and ethoxylates of phenol. Particular examples of anionic surfactants include a polyoxyethylene alkyl ether sulfuric ester salt, a polyoxyethylene alkylphenyl ether sulfuric ester salt, polyoxyethylene styrenated alkylether ammonium sulfate, polyoxymethylene alkylphenyl ether ammonium sulfate, and the like, and mixtures thereof. For instance, the anionic surfactant may include a polyoxyethylene alkyl ether sulfuric ester salt, a polyoxyethylene alkylphenyl ether sulfuric ester salt, or a mixture thereof.

As indicated above, in one embodiment, the coating solution may include a non-ionic surfactant. The non-ionic surfactant may be generally as known in the art. Generally, nonionic surfactants include, but are not limited to, amine oxides, fatty acid amides, ethoxylated fatty alcohols, block copolymers of polyethylene glycol and polypropylene glycol, glycerol alkyl esters, alkyl polyglucosides, polyoxyethylene glycol octylphenol ethers, sorbitan alkyl esters, polyoxyethylene glycol sorbitan alkyl esters, and mixtures thereof. For instance, the non-ionic surfactant may include a polyethylene oxide condensate of an alkyl phenol (e.g., the condensation product of an alkyl phenol having an alkyl group containing from 6 to 12 carbon atoms in either a straight chain or branched chain configuration, with ethylene oxide (e.g., present in amounts equal to 1 to 40 moles)). The alkyl substituent may be derived, for example, from polymerized propylene, di-isobutylene, octane or nonene. Other examples include dodecylphenol condensed with 12 moles of ethylene oxide per mole of phenol; dinonylphenol condensed with 5 moles of ethylene oxide per mole of phenol; nonylphenol condensed with 9 moles of ethylene oxide per mole of nonylphenol and di-iso-octylphenol condensed with 5 moles of ethylene oxide. The non-ionic surfactant may be a condensation product of a primary or secondary aliphatic alcohol having from 8 to 24 carbon atoms, in either straight chain or branched chain configuration, with from 1 to about 40 moles of alkylene oxide per mole of alcohol. The non-ionic surfactant may include a compound formed by condensing ethylene oxide with a hydrophobic base formed by the condensation of propylene oxide with propylene glycol (e.g., Pluronics).

As indicated above, in one embodiment, the coating solution may include a cationic surfactant. Examples of the cationic surfactant may include water-soluble quaternary ammonium compounds, polyammonium salts, a polyoxyethylene alkylamine and the like.

In particular, the surfactant may be a polymerizable surfactant. For instance, the surfactant may have a carbon-carbon double bond that can be utilized for polymerization and/or for bonding with other polymerizable monomers or oligomers present in the coating. Some of these polymerizable surfactants include polyoxyalkylene (e.g., polyoxyethylene) styrenated phenyl ether ammonium sulfate, polyoxyalkylene (e.g., polyoxyethylene) alkylether sulfuric ester, polyoxyalkylene (e.g., polyoxyethylene) alkylphenyl ether ammonium sulfate, polyoxyalkylene (e.g., polyoxyethylene) alkylphenyl ether. In general, these polymerizable surfactants include alkyl phenol ethoxylates.

When employed, surfactants typically constitute from about 0.001 wt. % or more, such as 0.005 wt. % or more, such as 0.01 wt. % or more, such as 0.1 wt. % or more to 5 wt. % or less, such as 3 wt. % or less, such as 2 wt. % or less, such as 1 wt. % or less, such as 0.5 wt. % or less, such as 0.25 wt. % or less.

C. Method

Suitable application techniques for applying the coating formulation to the glass substrate may involve, for example, dip coating, drop coating, bar coating, slot-die coating, curtain coating, roll coating, spray coating, printing, etc. The kinematic viscosity of the formulation may be adjusted based on the particular application employed.

Once applied, the coating formulation may be polymerized to form the interpenetrating network. The method of polymerization can be any as generally known in the art. For instance, polymerization may be via UV radiation, heating or a combination thereof. In one embodiment, only heating may be employed. In one embodiment, both UV radiation and heating may be employed to polymerize the various compounds. For instance, UV radiation may be employed to polymerize any acrylate compounds. Meanwhile, heating may be employed to form the crosslinked polyol and polysiloxane. Heating may also be employed to polymerize any acrylamide compounds. Such heating and UV exposure may be simultaneous. Alternatively, the heating may be conducted first and the UV light may follow. Or, the UV exposure may be first and the heating may follow.

If via sol-gel, the coating formulation may be cured at a temperature of from about 50° C. to about 350° C., in some embodiments from about 75° C. to about 325° C., in some embodiments from about 100° C. to about 300° C., in some embodiments from about 150° C. to about 300° C., and in some embodiments, from about 200° C. to about 300° C. for a period of time ranging from about 30 seconds to about 100 minutes, in some embodiments from about 30 seconds to about 50 minutes, in some embodiments from about 1 to about 40 minutes, and in some embodiments, from about 2 to about 15 minutes. Curing may occur in one or multiple steps. If desired, the coating formulation may also be optionally dried prior to curing to remove the solvent from the formulation. Such a pre-drying step may, for instance, occur at a temperature of from about 20° C. to about 150° C., in some embodiments from about 30° C. to about 125° C., and in some embodiments, from about 40° C. to about 100° C.

If via interpenetrating network, the polymerization temperature may be relatively low. That is, the temperature may be about 300° C. or less, such as about 250° C. or less, such as about 225° C. or less, such as about 200° C. or less, such as about 175° C. or less, such as about 150° C. or less, such as about 125° C. or less. The temperature may be 75° C. or more, such as about 100° C. or more, such as about 115° C. or more, such as about 125° C. or more, such as about 150° C. or more. Such thermal curing may be conducted for a period of time ranging from about 30 seconds to about 100 minutes, in some embodiments from about 30 seconds to about 50 minutes, in some embodiments from about 1 to about 40 minutes, and in some embodiments, from about 2 to about 30 minutes. In addition, thermal curing may be conducted in the presence of an air flow. That is, while polymerization occurs, air is circulated through the chamber or oven.

The UV exposure may be conducted at an intensity and time period that allows for sufficient polymerization depending on the types of monomers. For instance, for certain acrylates, UV exposure at an intensity of about 15 mW/cm$^2$ or more, such as about 20 mW/cm$^2$ or more, such as about 25 mW/cm$^2$ or more, such as about 30 mW/cm$^2$ or more for a period of time ranging from about 30 seconds to about 100 minutes, in some embodiments from about 30 seconds to about 50 minutes, in some embodiments from about 1 to about 25 minutes, and in some embodiments, from about 1 to about 10 minutes should be sufficient. In one embodiment, the UV exposure may be from 25 to 30 mW/cm$^2$ for a period of 5 minutes. In addition, UV exposure may be conducted in an inert atmosphere. For instance, the exposure may be conducted in the presence of argon gas or nitrogen gas. In one particular embodiment, the UV exposure is conducted in the presence of nitrogen gas.

In addition, the aforementioned heating/curing and UV exposure may also be employed to form the crosslinked hydrophilic polymer as disclosed herein. Thus, for the sake of conciseness, such disclosure will not be repeated.

If desired, the glass article may also be subjected to an additional heat treatment (e.g., tempering, heat bending, etc.) to further improve the properties of the article. The heat treatment may, for instance, occur at a temperature of from about 500° C. to about 800° C., and in some embodiments, from about 550° C. to about 750° C. The glass article may also undergo a high-pressure cooling procedure called "quenching." During this process, high-pressure air blasts the surface of the glass article from an array of nozzles in varying positions. Quenching cools the outer surfaces of the glass much more quickly than the center. As the center of the glass cools, it tries to pull back from the outer surfaces. As a result, the center remains in tension, and the outer surfaces go into compression, which gives tempered glass its strength. In the present invention, however, the tempering may occur prior to deposition and formation of the coating such that the coating may remain on the glass article to provide an antifog effect.

In certain embodiments, it may also be desirable to control coating so that the organic material (e.g., organic binders) is relatively low. Among other things, minimizing the degree of organic material can accelerate any subsequent heating steps (e.g., tempering). For example, the cured coating may contain organic material in an amount of about 1 wt. % or more, such as about 2 wt. % or more, such as about 3 wt. % or more, such as about 5 wt. % or more to about 12 wt. % or less, such as about 11 wt. % or less, such as about 10 wt. % or less of the coating, such as about 9 wt. % or less, such as about 8 wt. % or less of the coating.

The coating may have a thickness of about 500 nm or more, such as about 750 nm or more, such as about 1 μm or more, such as about 2 μm or more, such as about 3 μm or more, such as about 5 μm or more, such as about 7.5 μm or more, such as about 10 μm or more, to about 50 μm or less, such as about 40 μm or less, such as about 30 μm or less, such as about 20 μm or less, such as about 15 μm or less, such as about 10 μm or less. However, it should be understood that any thickness may be obtained and that the present invention may not necessarily be limited by the thickness.

Once the glass substrate is ready for use, for example ready for cutting, chemical modifications, etc., by a distribution or end user, the coating disclosed herein may be removed if so desired. Such removal techniques may be any as generally known in the art. For instance, the coating can be removed by washing the coating with a solvent, such as water.

The glass substrate disclosed herein could be used for a variety of applications. These may include eyewear, mirrors, and other household or commercial products. These may also include glass for refrigerator or freezer doors. In addition, these may also include vacuum insulated glass. The glass substrate may also be used for optical instruments. Accordingly, the glass substrate as disclosed herein may have many applications.

While embodiments of the present disclosure have been generally discussed, the present disclosure may be further understood by the following, nonlimiting examples.

EXAMPLES

Test Methods

Abrasion Resistance: The ability of a surface to resist abrasion caused by a scrubbing action can be determined in accordance with the following methods: Example 1—ASTM D2486 (dry brush, 170 g weight, 500 strokes) and ASTM 12/14 (wet brush, 170 g weight, 500 strokes); Example 2—DIN 53778 (dry brush, 177 g weight, 50 strokes) and ASTM 12 (wet brush, 177 g weight, 500 strokes). More specifically, surfaces with a predetermined weight are exposed to 500 strokes from both a wet and dry brush in separate tests. The magnitude of weight loss is indicative of the surface's ability to resist abrasion. The relative amount of scratch marks on each of the test surfaces can also be used as a mode of comparison. The scratch depth was measured by an Alpha-Step D-600. The samples were then scored on a scale from 1-6 (1=Very Poor (ablation upon cutting or water creep), 2=Poor (extensive ablation during brush test), 3=Borderline (strong streaks, ablation patches), 4=Acceptable (strong streaks), 5=Modest (modest streaks visible), and 6=Excellent (nothing visible)).

Contact Angle: The contact angle can be measured to determine the hydrophobicity/hydrophilicity of a material. To measure the contact angle, a sessile drop of a liquid, such as water, is placed on the substrate. The angle between the drop and the underlying article is then determined via visual inspection, such as by using a microscope. In particular, such measurement is made 5 seconds after placing the drop.

Coating Thickness: The coated layer of as coated glass is removed by a razor. The step height of the coating is observed using a profilometer. The data is an average measured from three points at different positions.

Cross-Hatch Adhesion: The cross-hatch adhesion is determined in accordance with ASTM D3359-09. For the test, cuts a certain distance apart are made in the coating depending on the thickness of the coating. Additionally, intersecting cuts are also made. Tape is placed on the grid area and within approximately 90 seconds of application, the tape is removed by pulling it off rapidly at as close to an angle of 180° as possible. The grid area is inspected for removal of coating from the substrate. The classifications go from 0B to 5B wherein 5B indicates that none of the squares of the lattice are detached. A value of less than 3B is indicative of a failure.

Stud Pull Strength: The adhesive strength of the coating can be evaluated by measuring the stud pull strength. The coating surface is blown with nitrogen gas. An aluminum dolly with a diameter of 20 mm is polished by sand paper (100#). An aldehyde-amine condensate/organocopper compound mixture (Loctite 736) is sprayed on the surface of the coating and an aluminum stud. After 5 minutes, an acrylic adhesive (312) s added to the surface of the aluminum stud and it is glued to the surface of the coating with pressure until solid adhesion is achieved. The glued aluminum stud and glass are placed at room temperature for 3 hours. The dolly is pulled by a PosiTest AT with a pull rate of 30 psi/sec. The adhesive strength is measured by the PosiTest AT. A strength of less than 450 psi is considered a failure.

Crockmeter Test: Crockmeter test follows the testing procedure of TP-209 (Guardian Ind.; Crockmeter: SDL Atlas CM-5). The size of glass is 3"×3" and total test cycle number is 750. The weight of arm is 345 g. The change of T % will be calculated by the difference of T % before and after crockmeter test. The specification of crockmeter test is ΔT %<1.5%.

Tape Pull Test: Tape pull test follows the testing procedure of TP-201-7 (Guardian Ind.). The tape (3179C, 3M) is placed on the surface of the glass by applying pressure. After 1.5 minutes, the tape is pulled out quickly with hand and the residual adhesive of tape will be removed with tissue paper (AccuWipe) soaked by NPA. The change of T % will be calculated by the difference of T % before and after tape pull test. The specification of tape pull test is ΔT %<1.5%.

NaOH Solution (0.1N) Test: NaOH test follows the testing procedure of TP301-7B (Guardian Ind.). Glass is immersed by NaOH solution (0.1 N) filled in one beaker at room temperature. After 1 hour, the glass is taken from solution, rinsed by deionized water and dried by $N_2$ gas. The change of T % will be calculated by the difference of T % before and after NaOH testing. The specification of water boil test is ΔT %<±0.5%.

Ammonium Solution Test: 10% of $NH_4OH$ solution is prepared by diluting of 29% of $NH_4OH$ solution with DI water. Antimicrobial glass is soaked inside solution and T % is measured before and after soaking of 5 days. The change of T % will be calculated by the difference of T % before and after testing.

Acid/Base Resistance: The ability of a surface to resist acid/bases can be determined by soaking a sample in HCl solution for a time period of about 60 minutes. The change of T % will be calculated by the difference of T % before and after testing.

Corrosion Resistance: The ability of a surface to resist corrosion can be determined in accordance with ASTM B368-09 (2014), which is known as the Copper-Accelerated Acetic Acid-Salt Spray (Fog) Testing ("CASS" Test). During this test, samples are subjected to a salt fog containing laden copper ions and then examined for color change after 120 hours of exposure using the method described above.

Condense Chamber Test (Water Fog): Glass is set in chamber with 45° C. and 100% of humidity for 21 days. T % before and after testing is measured. Meanwhile, adhesive strength of coated layer after testing is investigated by cross-hatch and no more 15% of film can be removed in order to pass test. The change of T % will be calculated by the difference of T % before and after testing.

High Humidity and High Temperature Chamber Test: Glass is set inside chamber with 85° C. and 85% of humidity for 10 days. The change of T % will be calculated by the difference of T % before and after testing.

Windex Test: Glass is soaked inside 100% of Windex solution and T % is measured before and after soaking of 5 days. The change of T % will be calculated by the difference of T % before and after testing.

Transparency: Transparency (T %) was measured by Hunter UltraScan XE with model of TTRIN from 350 nm to 1050 nm. Tvis % is calculated according to the following equation.

$$Tvis\, \% = \frac{\sum_{i=380}^{780} (T\, \%)_i}{\sum_{i=380}^{780} N_i}$$

Tuv % of antimicrobial glass at UV range is measured by UV-vis (Peking Elmer 950) and Tuv % is calculated by following equation.

$$Tuv\ \% = \frac{\sum_{i=300}^{380} (T\ \%)_i}{\sum_{i=300}^{380} N_i}$$

Anti-fog: At high temperatures, anti-fog performance is determined by exposing the glass above water steam caused by 100° C. of water inside a glass beaker. In certain examples, the steam may also be generated by heating water at 60° C. Alternatively in a cold environment, performance is evaluated by storing the coated glass inside a refrigerator (1° C.) or a freezer (−5° C., −6.7° C., or −18° C.) for 2 hours and then exposing the coated substrate to the ambient or a specified condition (e.g., temperature as 21° C. and humidity of 60%, temperature as 22° C. and humidity of 70%).

Example 1

Coating solutions were prepared according to the samples provided below. The optical properties of the raw glass were compared with glass containing an NEI cellophane coating and that of the present example. According to the results below, there was minimal change on transparency and reflection of either coated glass in comparison to raw glass. However, higher haze was observed for Sample 1 (482-185-9).

| Sample | T % | STD | R % | STD | H % | STD |
| --- | --- | --- | --- | --- | --- | --- |
| Raw glass | 90.05 | 0.03 | 8.21 | 0.01 | 0.07 | 0.06 |
| NEI AF glass | 90.44 | 0.01 | 7.81 | 0.01 | 0.17 | 0.03 |
| 482-185-9 | 90.26 | 0.08 | 7.28 | 0.12 | 0.95 | 0.60 |

| ID | Raw glass | 482-159-1 | 482-185-9 | Comments |
| --- | --- | --- | --- | --- |
| Vendor | — | NEI | Lab formulation | Yellow color is observed for NEI film when cured at oven of 150° C. for 20 min |
| Process | 4 mm soda-lime glass | 1 mil/50 mm/sec; 120° C./30 min/4 mm soda-lime glass/no primer | 1 mil/50 mm/sec; 200° C./30 min/4 mm soda-lime glass/no primer | |
| Optical property | | | | |
| T % | 90.05 | 90.44 | 90.26 | — |
| R % | 8.21 | 7.81 | 7.28 | |
| H % | 0.1 | 0.2 | 1 | |
| surface | | | | |
| Water contact angle, degree (at 1 minute) | — | 6.5 | 5.6 | Low water contact angle is developed after water drop on surface for 1 min |
| Thickness, μm | — | 5.9 | 7.3 | |
| Anti-fogging | | | | |
| AF (above 100° C. water steam) | — | Pass | Pass | Pass: formation of water film, no fogging |
| AF after stored in freezer (2 hr) | — | Pass | Pass | |
| Mechanical and adhesive strength | | | | |
| Cross-hatch | — | 5B | 5B | 5B: No film out |
| Crock meter (200 cycles) | — | 2 | 2 | 1: no scratch observed by naked eye |
| Tissue paper rub (water) | — | Pass | Pass | Pass: No scratch |
| Tape pull | — | Pass | Pass | Pass: No film out |
| Chemical and thermal stability | | | | |
| Water boiling 10 min (post CH) | — | Pass (5B) | Pass (5B) | Fail: Film out |
| NaOH, 0.1N/1 hr/r.t | — | Fail | Pass | |
| HCl, 5%, 1 hr | — | Fail | Pass | |
| Cutting oil, 24 h, r.t | — | Pass (5B) | Pass (5B) | |

Based on the antifog studies, there was minimal fogging on the NEI coated glass and that of Sample 1 when the sample was removed from the freezer at −20° C. after 2 hours and exposed to room temperature of 68° F. and 15% humidity; however, heavy fogging was observed on the raw glass. Without intending to be limited by theory, antifogging could be attributed to a hydrophilic surface, in particular a superhydrophilic surface, of the coated films.

In addition, antifog performance was also determined by exposing the glass to hot water steam. This study demonstrated the presence of fog on the raw glass with minimal or no fogging for the coated glass.

In addition, as indicated in the table above, the coating of Sample 1 demonstrates improved chemical resistance in comparison to the NEI coated sample.

Example 2

Coating solutions were prepared according to the samples provided below. In particular, a ternary interpenetrating network including cellophane, a metal oxide network (based on sol with metal and/or nonmetal alkoxides), and melamine-polyol resin was prepared. The metal oxide network included a hybrid network derived from copper acetate, aluminum butoxide, titanium isopropoxide, zinc acetate, and zirconium propoxide. Once prepared and coated, the coating was cured at a temperature of above 250° C.

A coating solution was prepared according to the following.

| Chem. (484-43-3 and 484-43-4) | Amt. |
|---|---|
| Cellophane solution from NEI (mL) | 3 |
| Inorganic sol (484-31-3) (mL) | 0.5 |
| Polyol/Melamine (484-42-2) (g) | 0.25 |
| Gen 1.5, 3% (mL) | 0.25 |

| Chem. (484-42-2) | Wt. (g) |
|---|---|
| Hexamethoxymethyl melamine | 3 |
| Polyol | 2 |
| Catalyst | 0.1 |

| Chem. (SiO$_2$ sol) | wt. (g) |
|---|---|
| NPA | 69.70 |
| Deionized water | 1.81 |
| Acetic acid (AcOH) | 4.89 |
| Tetraethyl orthosilicate (TEOS) | 3.64 |
| Nano silica particle (IPA-ST-UP) | 19.95 |

The following results were obtained based on averages of three samples.

| | Raw glass, 4 mm soda lime | Cellophane | 484-43-3 | 484-43-4 |
|---|---|---|---|---|
| Process | — | Primer (75° C./10 min) 2$^{nd}$ coating (120° C./30 min) | 200° C./30 min | 200° C./30 min; 5 min UV (30 mW/cm$^2$, 254 nm) |
| Optical Property | | | | |
| T % | 90.05 | 90.48 | 89.56 | 90.0 |
| R % | 8.21 | 7.81 | 7.88 | 7.75 |
| H % | 0.07 | 0.29 | 0.45 | 0.63 |
| Surface Property | | | | |
| Thickness, μm | — | 8.23 | 8.01 | 5.28 |
| Water contact angle, degree | — | 8.63 | 7.87 | 9.2 |
| Antifog | | | | |
| Above 100° C. water steam; 1 min | Fail | Pass | Pass | Pass |
| Above 60° C. water steam; 2 min | Fail | Pass | Pass | Pass |
| Mechanical and Adhesive Strength | | | | |
| Tape pull | — | Pass | Pass | Pass |
| Cross-hatch | — | 5B | 5B | 5B |
| Crock meter, 200 cycle/345 g | — | 1 | 2 | 1 |
| Stud pull | — | 578 | 611 | 1521 |
| Thermal Resistance | | | | |
| Water boiling | — | Pass; 5B, 10 min; no fog above 100° C. water steam | Pass; 5B, 60 min; no fog at 100° C. water steam | Pass; 5B, 60 min; no fog at 100° C. water steam |
| Chemical Resistance | | | | |
| NaOH, 0.1N, 1 hour, RT | — | Film out | Pass; 5B; no fog above 100° C. water steam | Pass; 5B; no fog above 100° C. water steam |

| | Raw glass, 4 mm soda lime | Cellophane | 484-43-3 | 484-43-4 |
|---|---|---|---|---|
| HCl, 5%, 1 hr, RT | — | Film out | Pass; 5B; no fog above 100° C. water steam | Pass; 5B; no fog above 100° C. water steam |
| Windex, 1 hr, RT | — | Pass; 5B; no fog above 100° C. water steam | Pass; 5B; no fog above 100° C. water steam | Pass; 5B; no fog above 60° C. water steam |
| DI water, 1 hr, RT | — | Pass; 5B; no fog above 100° C. and 60° C. water steam | Pass; 5B; no fog above 60° C. water steam; but fog on 100° C. water steam | Pass; 5B; no fog above 60° C. water steam; but fog on 100° C. water steam |

According to the results, there appears to be minimal difference in transparency and reflection of 484-43-3 (thermal/UV) compared with raw glass; however, there appears to be a slight increase on haze. In addition, improved abrasion resistance can be observed when dual curing as indicated by the crock meter test, which indicated no scratches. Also, adhesive strength of the glass made by dual curing as indicated by the stud pull test, which is approximately 2.5 times higher than that of the coating dried/cured by thermal processes alone. In addition, the chemical resistance as evaluated by both NaOH and HCl solutions indicated a more stable coating. For instance, the cellophane deteriorated in NaOH and HCl solutions thereby suggesting that the ternary interpenetrating network functions to upgrade film strength. Also, by increasing the content of melamine resin, abrasion resistance can be improved.

Example 3

Coating solutions were prepared according to the samples provided below. In particular, a ternary interpenetrating network including cellophane, a metal oxide network (based on sol with metal and/or nonmetal alkoxides), and melamine-polyol resin was prepared. The metal oxide network included a hybrid network derived from copper acetate, aluminum butoxide, titanium isopropoxide, zinc acetate, and zirconium propoxide. Coating was done using a 1 mil drawdown bar. Once prepared and coated, the coating was cured at a temperature of 120° C. in an oven for 30 minutes. The film was then transferred into a UV chamber and irradiated by UV light at 254 nm and a power of 30 mW/cm² for 3 minutes.

The coating solution was prepared according to the following.

| Chem. (484-56-4) | Amt. |
|---|---|
| Cellophane solution from NEI (mL) | 3.25 |
| Inorganic sol (mL) | 0.5 |
| Polyol/Melamine (484-42-2) (g) | 0.5 |

| Chem. (484-42-2) | Wt. (g) |
|---|---|
| Hexamethoxymethyl melamine | 2 |
| Polyol | 3 |
| Catalyst | 0.1 |

| Chem. (484-31-3) | Wt. (g) |
|---|---|
| SiO$_2$ sol | 0.2 |
| TiO$_2$ sol | 4 |
| CuO sol | 4 |
| Al$_2$O$_3$ sol | 0.4 |

| Chem. (SiO$_2$ sol) | wt. (g) |
|---|---|
| NPA | 59.7 |
| Deionized water | 1.808 |
| Acetic acid (AcOH) | 4.89 |
| Tetraethyl orthosilicate (TEOS) | 3.637 |
| Nano silica particle (IPA-ST-UP) | 2.993 |

| ID | TiO$_2$ sol | CuO sol | Al$_2$O$_3$ sol |
|---|---|---|---|
| Titanium isopropoxide | 2 | — | — |
| Aluminum s-butoxide | — | — | 2 |
| Copper acetate | — | 1.6 | — |
| NPA | 18 | 4 | 24 |
| Deionized water | 0.1 | 26 | — |
| Acetic acid | 0.1 | — | — |
| HNO$_3$ (70%) | 1 | 4.8 | 2 |

The performance of the coated glass article is provided below.

| Sample | Result | Specification |
|---|---|---|
| Mechanical and adhesive strength | | |
| Cross-hatch | 5B | 5B |
| Crock meter, 200 cycle, 345 g | 1 | 1 |
| Tape pull | Pass | Pass |
| Surface property | | |

| Sample | Result | Specification |
|---|---|---|
| Thickness, μm | 12 | 5-20 |
| Water contact angle, degree (after 5 seconds) | 7 | <10 |
| Chemical resistance | | |
| Windex soaking, 1 hour at RT | Post CH: 5B; Post AF (60° C./100° C.): Pass | Post CH: >4B; Post AF (60° C./100° C.): Pass |
| DI Water soaking, 1 hour at RT | Post CH: 5B; Post AF (60° C./100° C.): Pass | Post CH: >4B; Post AF (60° C./100° C.): Pass |
| Water boiling, 1 hour | Post CH: 5B; Post AF (60° C./100° C.): Pass | Post CH: >4B; Post AF (60° C./100° C.): Pass |
| Antifog | | |
| Antifog above water steam with 100° C. water | Pass | Pass |
| Antifog above water steam with 60° C. water | Pass | Pass |
| Antifog in −5° C. freezer, then exposed at 22° C. and 70% humidity | Pass | Pass |

Excellent mechanical and adhesive strength was achieved as there is no indication of any damage on the coated layer. With a contact angle close to 7 degrees, this indicates a quick water absorption thereby reducing or eliminating the presence of fog on the surface. In addition, the coated layer can survive a DI water and Windex soak for one hour with destruction on the surface, which is indicated by the post cross-hatch test. In addition, the soaked substrates maintained their antifog properties.

When compared with a mirror without the coating above, the mirror sample demonstrated excellent anti-fogging performance when tested above water steam generated from 60° C. and 100° C. For the mirror without the coating, a heavier condensation was observed compared with minimal, if any, condensation for the mirror with the coating. In addition, the reflection was compared between a mirror with the coating versus a raw mirror without a coating. Between 350 nm to 1500 nm, there appeared to be minimal difference in the reflection. There was a slight decrease on reflection from 350 nm to 500 nm.

Without intending to be limited, without the coating, water beads may formed on the surface. Meanwhile, with the coating, a water film may be formed on the surface. As a result, with the latter, incident light may be reflected in a diffusion pattern thereby generating the fog like appearance.

Example 4

Coating solutions were prepared according to the samples provided below. The coating solution was prepared as follows.

A UV curable water born solution with polymerized surfactant was developed by mixing a water soluble monomer, 2-hydroxyethyl acrylate, water soluble photo initiator, 2-hydroxy-2-methylpropiophenone and polymerized surfactant, KH10 and water soluble crosslinking agent, SR9035. The solution was stirred at room temperature for 30 min before using.

| Chem. (484-87-1) | Function | Wt. (g) |
|---|---|---|
| 2-hydroxy-2-methylpropiophenone | photo initiator | 0.1 |
| 15 mole ethoxylated trimethlolpropane triacrylate | water soluble crosslink agent | 0.2 |
| 2-hydroxyethyl acrylate | water soluble monomer | 2 |
| polyoxyethylene alkylether sulfuric ester | polymerized surfactant | 3 |
| Total | — | 5.3 |

| Chem. (484-42-2) | Wt. (g) |
|---|---|
| Hexamethoxymethyl melamine | 2 |
| Polyol | 3 |
| Catalyst | 0.1 |

A UV curable solvent solution was obtained by mixing isobornyl acrylate and a low viscosity aromatic monoacrylate oligomer with crosslinking agents, 3 mole ethoxylated trimethylolpropane triacrylate and low viscosity di pentaerythritol pentaacrylate.

| Chem. (482-150-1) | Wt. (g) |
|---|---|
| Isobornyl acrylate | 8 |
| Aromatic monoacrylate oligomer | 2 |
| 3 mole ethoxylated trimethylolpropane triacrylate | 1 |
| dipentaerythritol pentaacrylate | 1 |

A photoinitiator solution was prepared according to the following table:

| Chem. (482-150-2) | Function | Wt. (g) |
|---|---|---|
| 75% solution of iodonium, (4-methylphenyl)[4-(2-methylpropyl)phenyl]-, hexafluorophosphate(1-) in propylene carbonate | Photo initiator for cationic polymerization | 0.5 |
| 1:1 mixture by weight of 1-hydroxy-cyclohexyl-phenyl-ketone and benzophenone | Photo initiator for free radical polymerization | 0.5 |

-continued

| Chem. (482-150-2) | Function | Wt. (g) |
|---|---|---|
| bis(2,4,6-trimethylbenzoyl)-phenylphosphineoxide/2-hydroxy-2-methyl-1-phenyl-propan-1-one | Photo initiator for free radical polymerization | 0.5 |
| NPA | Solvent | 10 |

Thereafter, a UV curable solution was prepared according to the following:

| Chem. (484-89-7) | Function | Wt. (g) |
|---|---|---|
| 482-150-1 | Hydrophobic UV solution | 0.3 |
| 484-87-1 | Polymerized surfactant solution | 2 |
| 484-42-2 | Polyol/melamine resin | 0.7 |
| 482-150-2 | Photoinitiator | 0.05 |

Next, a coating solution was prepared according to the table below.

The contents were mixed at room temperature before coating the glass.

| Chem. (484-91-1) | Wt. (g) |
|---|---|
| UV curable solution (484-89-7) | 0.5 |
| NEI Based cellophane solution | 2.5 |

This example was utilized to study the coating on a laminated glass with two glass plates and a film of polyvinyl butyral between the glass plates. A laminated glass having a size of 8" by 12" and a thickness of 4 mm and a polyvinyl butyral intermediate layer thickness of 0.2 mm was provided. The laminated glass was washed with soap and dried by nitrogen gas. The solution was applied to the laminated glass substrate using a drawdown bar having a size of 1 mil wherein the speed of the coating was 50 mm/sec. The coating was dried/cured at 120° C. for 30 minutes and then placed in a UV chamber with a power of 30 mW/cm$^2$ for 3 minutes at 254 nm.

| Optical | |
|---|---|
| Transmittance, T % | 91.12 |
| Reflection, R % | 8.19 |
| Haze, H % | 0.6 |
| Surface | |
| Thickness, μm | ~12 μm |
| Water contact angle, degree (after 5 seconds) | 7.95 |
| Antifog | |
| above 100° C. water steam; 1 min | pass |
| above 60° C. water steam; 1 min | pass |
| Freezer testing: stored at −6.7° C. for one hour, then exposed at 21° C. and 70% humidity | Pass |
| Mechanical and adhesive strength | |
| Tape pull | pass |
| Cross-hatch | 5B |
| Crock meter, 200 cycle/345 g of arm | pass (2); minor scratch observed by magnifying lens |
| Stud pull, psi | 512 |
| Thermal stability | |
| Water boiling (60 min) | Post CH: 5B; no fog at 60° C. and 100° C. water steam |
| Chemical resistance and durability | |
| NaOH, 0.1N, 1 hr, RT | Post CH: 5B; no fog at 60° C. and 100° C. water stream |
| Windex, 1 hr, RT | Post CH: 5B; no fog at 60° C. and 100° C. water steam |
| D.I water, 1 hr, RT | Post CH: 5B; no fog at 60° C. and 100° C. water steam |
| HCl, 5%, 1 hr, RT | Fail, film damaged after soaking |

In addition, the optical properties of the coated laminated glass were compared with uncoated laminated glass.

| Glass | T % | R % | H % |
|---|---|---|---|
| Laminated glass | 90.57 | 8.68 | 0.38 |
| Laminated AF glass | 91.12 | 8.19 | 0.6 |

As indicated, there is minimal change in transparency and reflection when coated.

During the hot antifog test at 100° C., a thin film is observed on the coated portion of the glass thereby indicating specular reflection. Meanwhile, water beads are observed on the uncoated portions thereby indicating diffusive reflection. During the cold antifog test at −6.7° C., antifog performance was realized on the coated portion of the laminated glass.

The mechanical strength of the coated film was assessed by crock-meter. After 200 cycles of polishing, only slight scratch lines can be observed under magnifying lens with almost no scratching by polishing with normal paper towel. Adhesive strength is confirmed by measurements of cross-hatch and stud pull. According to the cross hatch and tape pull, no film could be peeled off.

According to the chemical resistance tests, no damage was observed on the coated film after soaking in NaOH, DI water, or Windex and the post cross-hatch is the same as before soaking. Also, the antifog performance was the same as before soaking. These tests indicate excellent thermal stability and durability. However, the film was damaged after soaking in the HCl solution.

Example 5

Coating solutions were prepared according to the samples provided below.

| Chem. | Amt. |
|---|---|
| Acrylamide soln. (484-129-1) (mL) | 0.5 |
| Acrylate soln. (484-90-4) (g) | 1 |
| Acrylate soln. (456-150-1) (g) | 0.1 |
| Silane sol (482-57-1) (mL) | 0.2 |

For the acrylamide solution below, the acrylamide was dissolved in deionized water by stirring for 30 minutes.

| Chem. (484-129-1) | Wt. (g) |
|---|---|
| Acrylamide | 2 |
| Deionized water | 15 |

The remaining solutions were prepared according to the following:

| Chem. (484-90-4) | Amt. |
| --- | --- |
| 2-Hydroxy-2-methylpropiophenone (ml) | 0.5 |
| 15 mole ethoxylated trimethylolpropane triacrylate (g) | 2 |
| 20 mole ethoxylated trimethlolpropane triacrylate (g) | 2 |
| 2-hydroxyethyl acrylate (ml) | 13 |
| Polyoxymethylene alkylphenyl ether (g) | 10 |

| Chem. (456-150-1) | Wt. (g) |
| --- | --- |
| Isobornyl acrylate | 8 |
| Aromatic monoacrylate oligomer | 2 |
| 3 mole ethoxylated trimethylolpropane triacrylate | 1 |
| dipentaerythritol pentaacrylate | 1 |

| Chem. (482-57-1) | Wt. (g) |
| --- | --- |
| NPA | 86.673 |
| Deionized water | 1.808 |
| Acetic acid (AcOH) | 4.89 |
| Tetraethyl orthosilicate (TEOS) | 3.637 |
| Nano silica particle (IPA-ST-UP) | 2.993 |

Glass was coated using wet coating technology. The solution was coated using a drawdown bar to obtain a coating having a film thickness of 10 to 20 microns. The glass was cured in a UV chamber using a density of 30 mW/cm$^2$ and a wavelength of 254 nm for 3 minutes. The glass was heated in an oven at 200° C. for 20 minutes. The coating had an Ra of 0.09 and an Rz of 0.43.

Also, for this glass, fast water absorption was observed as the water contact angle decreased quickly from 20 degrees to 5 degrees. Antifog performance was also achieved by placing the glass inside a freezer at −18° C. for 20 minutes and then exposed at room temperature for 1 minute. This antifog performance could be attributed to the water absorption of the antifog film built by surfactants and the water soluble polymers.

Example 6

Coating solutions were prepared according to the samples provided below.

| Chem. | Amt. |
| --- | --- |
| Acrylamide soln. (484-129-1) (mL) | 0.5 |
| Acrylate soln. (484-90-4) (g) | 1 |
| Melamine-polyol soln. (484-42-2) (g) | 0.1 |
| Silane sol (482-57-1) (mL) | 0.2 |

For the acrylamide solution below, the acrylamide was dissolved in deionized water by stirring for 30 minutes.

| Chem. (484-129-1) | Wt. (g) |
| --- | --- |
| Acrylamide | 2 |
| Deionized water | 15 |

The remaining solutions were prepared according to the following:

| Chem. (484-90-4) | Amt. |
| --- | --- |
| 2-Hydroxy-2-methylpropiophenone (ml) | 0.5 |
| 15 mole ethoxylated trimethylolpropane triacrylate (g) | 2 |
| 20 mole ethoxylated trimethlolpropane triacrylate (g) | 2 |
| 2-hydroxyethyl acrylate (ml) | 13 |
| Polyoxymethylene alkylphenyl ether (g) | 10 |

| Chem. (482-57-1) | Wt. (g) |
| --- | --- |
| NPA | 86.673 |
| Deionized water | 1.808 |
| Acetic acid (AcOH) | 4.89 |
| Tetraethyl orthosilicate (TEOS) | 3.637 |
| Nano silica particle (IPA-ST-UP) | 2.993 |

| Chem. (484-42-2) | Wt. (g) |
| --- | --- |
| Hexamethoxymethyl melamine | 3 |
| Polyol | 2 |
| Catalyst | 0.1 |

Glass was coated using wet coating technology. The soda-lime glass had a thickness of 4 mm. The solution was coated using a drawdown bar to obtain a coating having a film thickness of 10 to 20 microns. The glass was cured in a UV chamber using a density of 30 mW/cm$^2$ and a wavelength of 254 nm for 3 minutes. The glass was heated in an oven at 200° C. for 20 minutes. The coating had an Ra of 0.09 and an Rz of 0.43.

The glass was evaluated by placing it into a freezer at −18° C. for 20 minutes. The door was opened for 1 minute to expose the glass to a room temperature of 21° C. and a humidity of around 60%. This was carried out seven times and no fog was observed. However, fog was observed on uncoated glass by condensation of moisture from the air. Without intending to be limited by theory, the coating may play an antifog role or function because of the fast water absorption by the antifog coating.

| Test item | Commercial Saint-Gobain Sample | 484-136-2 |
| --- | --- | --- |
| Optical | | |
| Transmittance, T % | 90.5 | 90.5 |
| Reflection, R % | 8.4 | 8.3 |
| Haze, H % | 0.8 | 0.32 |

-continued

| Test item | Commercial Saint-Gobain Sample | 484-136-2 |
|---|---|---|
| Optical | | |
| Thickness, μm | 22.3 | 16.1 |
| Water contact angle, degree | 13.7 | 8.2 |
| Antifog | | |
| above 100° C. water steam; 1 min | Pass | Pass |
| Freezer testing: stored at −18° C. for one hour, then exposed at 21° C. and 70% humidity | Pass | Pass |
| Mechanical and adhesive strength | | |
| Tape pull | Pass | Pass |
| Cross-hatch | 5B | 5B |
| Crock meter, 200 cycle/345 g of arm | 4 | 3 |
| Stud pull, psi | 1277 | 519 |
| Thermal stability | | |
| Water boiling (60 min) | Post CH: 5; 100° C. antifog - pass; −18° C. antifog - N/A | Post CH: 5; 100° C. and −18° C. antifog - pass |
| Chemical resistance and durability | | |
| NaOH, 0.1N, 1 hr, RT | Post CH: 5B; no fog at 100° C.; −18° C. (N/A) | Film fail |
| Windex, 1 hr, RT | Post CH: 5B; no fog at 100° C.; −18° C. (N/A) | Post CH: 5B; no fog at 100° C. and −18° C. |
| D.I water, 1 hr, RT | Post CH: 5B; no fog at 100° C.; −18° C. (N/A) | Post CH: 5B; no fog at 100° C. and −18° C. |
| HCl, 5%, 1 hr, RT | Post CH: 5B; no fog at 100° C.; −18° C. (N/A) | Antifog pass at 100° C. and −18° C. |

As indicated above, the durability was determined by soaking the glass in DI water and Windex for 1 hour. The antifog function was checked in the freezer after soaking at different times, then washing with DI water and drying at ambient conditions for 12 hours. The soak times were 1 hour, 2 hours, 4 hours, and 7 hours. During soaking, surfactants and water soluble polymers could be dissolved thereby affecting the antifog function of the coating. In addition, the water could harm the structure of the coating by causing the water soluble polymer to swell and peel from the glass. However, there was no sign of any damage to the coating or effect on the antifog function of the coating, even after soaking for 7 hours, thereby indicating a desirable durability.

Regarding the water contact angle measurements, three stages were observed. Over the stages, it was observed that the water contact angle decreased quickly with wetting time. At the first stage, water was absorbed by the coating, such as the charge groups of the surfactants and/or the hydrophilic groups of the water soluble polymers, such as the hydroxyl and/or amino groups. At the second stage, the absorbed water on the surface of the coating could be transferred to inside the coating with the crosslinked network; the thickness of the coating can increase due to swelling. At stage three, the water film is generated and the water contact angle is generally constant.

In comparison to a commercial product, the scratch resistance of the present example, as evaluated by crock-meter, was better than the commercial example. However, weaker chemical resistance to a base solution, such as NaOH was observed.

Example 7

Soda-lime glass with a thickness of 4 mm is coated with a solution as provided below. The film thickness was from 7-10 μm. The coated glass was cured in an oven at 120° C. for 30 minutes and then in a UV chamber with an intensity of 30 mW/cm$^2$ at a wavelength of 254 nm for 3-5 minutes.

| Test item | NEI SR-100 (482-159-1) | 484-91-1 (STC) |
|---|---|---|
| Optical | | |
| Transmittance, T % | 90.5 | 89.1 |
| Reflection, R % | 7.8 | 8.1 |
| Haze, H % | 0.3 | — |
| Optical | | |
| Thickness, μm | 8.2 | 8 |
| Water contact angle, degree | 5.9 | 19.6 |
| Antifog | | |
| above 100° C. water steam; 1 min | Pass | Pass |
| Refrigerator testing: stored at 1° C. for one hour, then exposed at 21° C. and 70% humidity | Fail | Pass |

| Test item | NEI SR-100 (482-159-1) | 484-91-1 (STC) |
|---|---|---|
| Mechanical and adhesive strength | | |
| Tape pull | Pass | Pass |
| Cross-hatch | 5B | 5B |
| Crock meter, 200 cycle/ 345 g of arm | 2 | 2 |
| Stud pull, psi | 578 | 705 |
| Thermal stability | | |
| Water boiling (60 min) | Post CH: 5; 100° C. antifog - fail; 1° C. antifog - N/A | Post CH: 5; 100° C. and 1° C. antifog - pass |
| Chemical resistance and durability | | |
| NaOH, 0.1N, 1 hr, RT | Film fail | Post CH: 5B; no fog at 100° C. and 1° C. |
| Windex, 1 hr, RT | Film fail | Post CH: 5B; no fog at 100° C. and 1° C. |
| D.I water, 1 hr, RT | Antifog fail at 100° C. and 1° C. | Post CH: 5B; no fog at 100° C. and 1° C. |
| HCl, 5%, 1 hr, RT | Film fail | Post CH: 5B; no fog at 100° C. and 1° C. |

The antifog coating of the present example demonstrated thermal stability in comparison to the commercially available product. In addition, the mechanical strength, as determined based on cross hatch, is the same as before testing.

The glass was evaluated by placing it into a refrigerator at 1° C. for 2 hours and then exposed to a room temperature of 21° C. and a humidity of around 60%. The coating can convert any condensed water beads to a water film that can reduce diffusive reflection. Even after 180 seconds, the coated sample did not exhibit any fog on the glass. However, a clear fog area could be observed in the uncoated areas of the glass.

Example 8

Coating solutions were prepared according to the following:

| | wt. (g) | |
|---|---|---|
| Chem. | 465-122-1 | 465-122-5 |
| Aromatic monoacrylate oligomer | 1 | 1 |
| Polycarbodiimide crosslinker | 0.8 | 1 |
| 2-Hydroxy-2-methylpropiophenone | 0.2 | 0.2 |
| 15 mole ethoxylated trimethylolpropane triacrylate | 1 | 1 |
| acrylamide solution | 2 | 2 |
| 2-hydroxyethyl Acrylate | 4 | 4 |
| Polyoxyethylene alkylphenyl ether | 1 | 1 |
| Total | 10 | 10.2 |
| Polycarbodiimide crosslinker wt. % | 8.00 | 9.80 |
| Weight ratio of polycarbodiimide to acrylate monomer | 0.8 | 1 |
| Aromatic monoacrylate oligomer wt. % | 10.00 | 9.80 |

| | wt. (g) | | |
|---|---|---|---|
| Chem. | 465-123-1 | 465-123-2 | 465-123-3 |
| Aromatic monoacrylate oligomer | 1.5 | 2 | 2.5 |
| Polycarbodiimide crosslinker | 0.8 | 0.8 | 0.8 |
| 2-Hydroxy-2-methylpropiophenone | 0.2 | 0.2 | 0.2 |
| 15 mole ethoxylated trimethylolpropane triacrylate | 1 | 1 | 1 |
| acrylamide solution | 2 | 2 | 2 |
| 2-hydroxyethyl Acrylate | 4 | 4 | 4 |
| Polyoxyethylene alkylphenyl ether | 1 | 1 | 1 |
| Total | 10.5 | 11 | 11.5 |
| Polycarbodiimide crosslinker wt. % | 7.62 | 7.27 | 6.96 |
| Weight ratio of Polycarbodiimide to acrylate monomer | 0.53 | 0.40 | 0.32 |
| Aromatic monoacrylate oligomer wt. % | 14.29 | 18.18 | 21.74 |

| | wt. (g) | | |
|---|---|---|---|
| Chem. | 465-128-1 | 465-128-2 | 465-128-3 |
| Aromatic monoacrylate oligomer | 1 | 1 | 2.5 |
| Polycarbodiimide crosslinker | 0.9 | 0.8 | 0.8 |
| Isocyanate | 0.1 | 0.2 | 0 |
| 2-Hydroxy-2-methylpropiophenone | 0.2 | 0.2 | 0.2 |
| 15 mole ethoxylated trimethylolpropane triacrylate | 1 | 1 | 1 |
| acrylamide solution | 2 | 2 | 2 |
| 2-hydroxyethyl Acrylate | 4 | 4 | 4 |
| Polyoxyethylene alkylphenyl ether | 1 | 1 | 1 |
| Total | 10.2 | 10.2 | 11.5 |
| Polycarbodiimide crosslinker wt. % | 8.82 | 7.84 | 6.96 |
| Weight ratio of polycarbodiimide to acrylate monomer | 1 | 1 | 0.32 |
| Aromatic monoacrylate oligomer wt. % | 9.80 | 9.80 | 21.74 |

For the acrylamide solution below, the acrylamide was dissolved in deionized water by stirring for 30 minutes.

| Chem. | Wt. (g) |
|---|---|
| Acrylamide | 8 |
| Deionized water | 60 |

Soda-lime glass with a size as 4"×8" and thickness as 4 mm is washed by washing machine with Deionized water and dried by $N_2$ gas. The glass is placed on an end of a coating machine (BYK). Coating solution around 1.2 ml is added on the edge of the glass plate using a drawdown bar (BYK) with size as 1 mil. Coating speed is set as 50 mm/sec. Coated glass will be transferred into one UV chamber (Dymax 2000) equipped with metal halide UV lamp (MHL 450/HG; USHIO) and coated glass plate then is irradiated by certain UV time such as 3 or 4 min to develop UV cured coating layer. The UV density inside UV chamber is around 30 mW/cm². Then, the coated glass will be moved to a thermal oven with air circulation for 20 min at 180° C. to finish thermal curing.

The effect of weight ratio of polycarbodiimide to acrylate monomer on performances of glass is evaluated when concentration of acrylate monomer is around 10 wt. %. It can be anticipated the crosslinking density of network will be increased with higher weight ratio of polycarbodiimide to acrylate monomer. Hence, chemical resistance of glass, such as the resistance to attacking of Windex can be improved.

| ID | 465-122-4 | 465-122-2 | 465-122-3 | 465-122-1 | 465-122-5 |
|---|---|---|---|---|---|
| Crockmeter, 200 cycles/345 g of arm | 2 | 1.5 | 2 | 1.5 | 1 |
| Tape pull | Pass | Pass | Pass | Pass | Pass |
| Cross hatch | 5B | 5B | 5B | 5B | 5B |
| Stud pull, psi | 728 | 968 | 943 | 893 | 981 |
| Windex soaking, 1 hour | Fail | Fail | Fail | Fail | Pass |
| Deionized water soaking, 24 hours | Fail | Pass | Pass | Pass | Pass |
| Freezer testing | Pass | Pass | Pass | Pass | Pass |
| Weight ratio of polycarbodiimide to acrylate monomer | 0 | 0.4 | 0.6 | 0.8 | 1 |

The effect of concentration of acrylate monomer on performance of glass is further examined by keeping weight ratio of polycarbodiimide to acrylate monomer around 0.3-0.5 but the concentration of acrylate monomer is changed from 10 wt. % to 21 wt. %. It is clear excellent performance of antifog glass, including antiscratch, chemical resistance, and adhesive strength had been achieved with these formulations. It is clear higher concentration of acrylate monomer in formulation could impact the performance of AF film. This is because the acrylate monomer can make a contribution to the mechanical strength and chemical resistance of the film due to it absorbed water slightly and aromatic structure exhibited strong resistance to base solution, such as Windex.

| Chem. | 465-123-1 | 465-123-2 | 465-123-3 |
|---|---|---|---|
| Weight ratio of polycarbodiimide to acrylate monomer | 0.53 | 0.40 | 0.32 |
| Aromatic monoacrylate oligomer wt. % | 14.29 | 18.18 | 21.74 |
| Crockmeter, 200 cycles/345 g of arm | 1 | 1 | 1 |
| Tape pull | Pass | Pass | Pass |
| Cross hatch | 5B | 5B | 5B |
| Stud pull, psi | 851 | 725 | N/A |
| Windex soaking, 1 hour | Pass | Pass | Pass |
| Deionized water soaking, 24 hours | Pass | Pass | Pass |
| Freezer testing | Pass | Pass | Pass |

The effect of mixed crosslinking agents on performances of AF glass is evaluated and the table below shows the results measured by various methods. It is clear both adhesive and mechanical strength of AF film is improved because crockmeter values reached to 2 and stud pull data was higher than 1000 psi. Meanwhile, excellent chemical resistance evaluated by soaking samples in regular Windex and Deionized water had been accomplished. There were no damaged parts on the soaked samples. It could also pass post freeze testing and post cross hatch after freeze testing was ranked as 5.

| ID | 465-128-1 | 465-128-3 |
|---|---|---|
| T % | 89.5 | 89.4 |
| R % | 8.6 | 8.6 |
| H % | 0.2 | 0.2 |
| Thickness, μm | 18.1 | 17.5 |
| Crockmeter 200 cycles/345 g arm | 2 | 2 |
| Tape pull | Pass | Pass |
| Cross-hatch | 5B | 5B |
| Stud pull, psi | 1066 | 1057 |
| Freeze | Pass | Pass |
| Windex soaking 1 hour | Pass | Pass |
| Deionized water soaking, 24 hours | Pass | Pass |

In addition, environmental durability of AF glass is further investigated with chambers. The table below summarizes the testing results. It is clear excellent durability had been achieved due to all samples surviving the designed chamber testing and passing post freeze testing.

| ID | 465-128-1 | 465-128-3 |
|---|---|---|
| Environmental cycle (Freeze thaw); 1 day | Pass/5 | Pass/5 |
| CASS 5 days | Pass/5 | Pass/5 |
| Salt fog, 5 days | Pass/5 | Pass/5 |
| 85C/85H, 5 days | Pass/5 | Pass/5 |
| Water fog, 5 days | Pass/5 | Pass/5 |
| Qsun, 10 days | Pass/5 | Pass/5 |

Also, a comparison of the performance of AF glass was conducted between a tertiary interpenetrating network and a dual crosslinking network. One noticeable difference is the enhanced adhesive and mechanical strength observed by AF glass with dual crosslinking networks.

| ID | 484-136-2 | 465-128-1 | 465-128-3 |
|---|---|---|---|
| Structure | Tertiary interpenetrating polymer network made by polyol/melamine; crosslinked polyacrylamide and polymerized surfactant/polysiloxane and SiO$_2$ nanoparticles | Crosslinked polyacrylate structure developed UV polymerization and enhanced crosslinked network with mixed crosslinking agents of polycarbodiimide and isocyanate | Crosslinked polyacrylate structure developed UV polymerization and enhanced crosslinked network with polycarbodiimide |
| Cross-meter (200 cycle/345 g) | 2-3 | 1-2 | 1-2 |
| Stud pull, psi | 537 | 1066 | 1057 |
| Cross-hatch | 5B | 5B | 5B |
| Table pull | pass | pass | pass |
| Freezer test (−18 C.) | pass | pass | pass |

| ID | 484-136-2 | 465-128-1 | 465-128-3 |
|---|---|---|---|
| Windex (regular), 1 h | pass post freezer test, post CH: 5B | pass post freezer test, post CH: 5B | pass post freezer test, post CH: 5B |
| Deionized water, 24 h | pass post freezer test, post CH: 5B | pass post freezer test, post CH: 5B | pass post freezer test, post CH: 5B |
| Water fog/Salt fog/CASS/(85/85)/QSUN | (N/A)/5/5/5/10 days; pass post freezer test and post CH: 5B | 5/5/5/5/10 days, pass post freezer test and post CH: 5B | 5/5/5/5/10 days, pass post freezer test and post CH: 5B |

Also, a comparison of the performance of AF glass was conducted between a commercially available cellophane solution, a cellophane/inorganic sol/polyol-melamine network, and one formed from dual crosslinking agents as disclosed in this example.

| Coating solution | NEI (484-159-1) | 484-56-4 U2 | 465-128-3 |
|---|---|---|---|
| Process | primer (75° C./10 min); second coating(120° C./30 min); 4 mm soda-lime glass | 1 mil; 200° C./30 min; 2 min UV (30 mW/cm$^2$; 254 nm); 4 mm soda-lime glass | 1 mil; UV 3 min; 180° C./20 min |
| Optical | | | |
| Transmittance, T % | 90 | 90.9 | 89.4 |
| Reflection, R % | 7.8 | 7.1 | 8.6 |
| Haze, H % | 0.6 | 0.2 | 0.2 |
| Surface | | | |
| Thickness, μm | 8.2 | 7.3 | 17.5 |
| Water contact angle, degree | 5.9 (5 sec) | 4.91 (5 sec) | 36 (3 min) |
| Antifog | | | |
| above 100° C. water steam; 1 min | Pass | pass | Pass |
| above 60° C. water steam; 1 min | Pass | pass | Pass |
| EN 166; 23° C.; 45% H, 8 sec | T = 99.53% | T = 99.23 | N/A |
| EN 166; 23° C.; 45% H, 30 sec | T = 99.530% | T = 99.78 | N/A |
| Freezer testing: stored at −20° C. for 20 min, then exposed at 23° C. and 50-60H %; repeat 7 times | Fail | Fail | Pass |
| Mechanical and adhesive strength | | | |
| Tape pull | pass | pass | Pass |
| Cross-hatch | 5B | 5B | 5B |
| Crock meter, 200 cycle/345 g of Arm | 1-2 | 1-2 | 1-2 |
| Stud pull, psi | 578 | 1380 | 1066 |
| Thermal stability | | | |
| Water boiling (60 min) | pass, 5B; no fog at 60° C. and 100° C. water steam | pass, 5B; no fog at 60° C. and 100° C. water steam | pass, 5B; no fog at 60° C. and 100° C. water steam and post freeze testing |
| Chemical resistance | | | |
| NaOH, 0.1N, 1 hr, r.t | Fail | 5B; no fog at 60° C. and 100° C. water steam | 5B; no fog at 60° C. and 100° C. water steam and post freeze test |
| HCl, 5%, 1 hr, r.t | Fail | 5B; no fog at 60° C. and 100° C. water steam | Fail |
| Cutting oil, 24 hours, r.t | N/A | 5B; no fog at 60° C. and 100° C. water steam | Pass |
| Windex, 1 hr, r.t | 5B; no fog at 60° C. and 100° C. water steam Pass | 5B; no fog at 60° C. and 100° C. water steam | 5B; no fog at 60° C. and 100° C. water steam and post freeze test |
| D.I water, 1 hr, r.t | 5B; no fog at 60° C. and 100° C. water steam Pass | pass; 5B; no fog above 60° C. water steam; but fog on 100° C. water steam | Pass (24 hours); 5B; no fog at 60° C. and 100° C. water steam and post freeze test |

| Coating solution | NEI (484-159-1) | 484-56-4 U2 | 465-128-3 |
|---|---|---|---|
| Durability | | | |
| Freezer thaw TP-603 (5), 1 day | Fail | Fail | Pass post freeze and post cross-hatch: 5B |
| CASS, TP-701, 5 days | Fail | Fail | Pass post freeze and post cross-hatch: 5B |
| Salt fog, TP-703, 5 days | Fail | Fail | Pass post freeze and post cross-hatch: 5B |
| Water fog, TP-707 (2), 5 days | Fail | Fail | Pass post freeze and post cross-hatch: 5B |
| 85° C./85H, TP-710(2), 5 days | Fail | Fail | Pass post freeze and post cross-hatch: 5B |
| Qsun, 10 days | Fail | Fail | Pass post freeze and post cross-hatch: 5B |

Example 9

Coating solutions were prepared according to the following:

| | wt. (g) | | |
|---|---|---|---|
| Chem. | 465-110-1 | 465-110-2 | 465-110-3 |
| Aromatic monoacrylate oligomer | 1 | 1 | 1 |
| Isocyanate | 0.2 | 0 | 0 |
| Tri-functional aziridine | 0 | 0.2 | 0 |
| Polycarbodiimide crosslinker | 0 | 0 | 0.2 |
| 2-Hydroxy-2-methylpropiophenone | 0.2 | 0.2 | 0.2 |
| 15 mole ethoxylated trimethylolpropane triacrylate | 1 | 1 | 1 |
| acrylamide solution | 2 | 2 | 2 |
| 2-hydroxyethyl Acrylate | 4 | 4 | 4 |
| Polyoxyethylene alkylphenyl ether | 1 | 1 | 1 |
| Total | 9.4 | 9.4 | 9.4 |

| | wt. (g) | | |
|---|---|---|---|
| Chem. | 465-111-1 | 465-111-2 | 465-111-3 |
| Aromatic monoacrylate oligomer | 1 | 0 | 0 |
| Ethoxylated bisphenol A dimethacrylate | 0 | 1 | 0 |
| Epoxy acrylate | 0 | 0 | 1 |
| Tri-functional aziridine | 0.2 | 0.2 | 0.2 |
| 2-Hydroxy-2-methylpropiophenone | 0.2 | 0.2 | 0.2 |
| 15 mole ethoxylated trimethylolpropane triacrylate | 1 | 1 | 1 |
| acrylamide solution | 2 | 2 | 2 |
| 2-hydroxyethyl Acrylate | 4 | 4 | 4 |
| Polyoxyethylene alkylphenyl ether | 1 | 1 | 1 |
| Total | 9.4 | 9.4 | 9.4 |

| | wt. (g) | | |
|---|---|---|---|
| Chem. | 465-101-4 | 465-101-5 | 465-101-6 |
| Aromatic monoacrylate oligomer | 0.5 | 0.3 | 1 |
| Tri-functional aziridine | 0.2 | 0.2 | 0.2 |
| 2-Hydroxy-2-methylpropiophenone | 0.2 | 0.2 | 0.2 |
| 15 mole ethoxylated trimethylolpropane triacrylate | 1 | 1 | 1 |
| acrylamide solution | 2 | 2 | 2 |
| 2-hydroxyethyl Acrylate | 4 | 4 | 4 |
| Polyoxyethylene alkylphenyl ether | 1 | 1 | 1 |
| Total | 8.9 | 8.7 | 9.4 |
| Weight ratio of aromatic monoacrylate oligomer to aziridine | 2.5 | 1.5 | 5 |

For the acrylamide solution, the acrylamide was dissolved in deionized water by stirring for 30 minutes.

| Chem. | Wt. (g) |
|---|---|
| Acrylamide | 8 |
| Deionized water | 60 |

Soda-lime glass with a size as 4"×8" and thickness as 4 mm is washed by washing machine with Deionized water and dried by $N_2$ gas. The glass is placed on an end of a coating machine (BYK). Coating solution around 1.2 ml is added on the edge of the glass plate using a drawdown bar (BYK) with size as 1 mil. Coating speed is set as 50 mm/sec. Coated glass will be transferred into one UV chamber (Dymax 2000) equipped with metal halide UV lamp (MHL 450/HG; USHIO) and coated glass plate then is irradiated by certain UV time such as 3 or 4 min to develop UV cured coating layer. The UV density inside UV chamber is around 30 mW/cm$^2$. Then, the coated glass will be moved to a thermal oven with air circulation for 25 min at 200° C. to finish thermal curing.

The effect of the weight ratio of the aromatic monoacrylate oligomer to the aziridine was first studied. There appears to be no difference on the performance of AF glass when weight ratio changed from range of 1.5 to 5. Both excellent mechanical strength with value of crockmeter as 1 and chemical resistance of passing Windex soaking test are achieved. More aziridine as crosslinking agent in the coating solution might increase the crosslinking density of the network but higher crosslinking density in AF film could result in a decrease in the elastic property.

| ID | 465-101-4 | 465-101-5 | 465-101-6 |
|---|---|---|---|
| Crock-meter, 200 cycles/345 g | 1 | 1 | 1 |
| Tape-pull | Pass | Pass | Pass |
| Cross-hatch | 5B | 5B | 5B |

-continued

| ID | 465-101-4 | 465-101-5 | 465-101-6 |
|---|---|---|---|
| Freezer testing | Pass/post CH: 5B | Pass/post CH: 5B | Pass/post CH: 5B |
| Windex soaking, 1 hour | Pass | Pass | Pass |
| Deionized water soaking, 24 hours | Pass | Pass | Pass |

Also, the effect of UV curing time on the glass was studied based on 465-110-2. The AF glass demonstrated the best results when UV curing time was 3 min and the thermal curing time was 20 min. When UV time increased, the polymer film might be degraded by attacking of the UV light to polymer bonds, which may be why the mechanical strength of the film evaluated by crock-meter measurement was reduced and chemical resistance of the AF film investigated by soaking in the Windex solution failed.

| ID | UV (min) | Crock-meter | Freezer test | Windex, 1 hour | Deionized water, 24 hours |
|---|---|---|---|---|---|
| 465-114-1 | 3 | 1 | Pass | Pass | Pass |
| 465-114-2 | 4 | 2.5 | Pass | Fail | Pass |
| 465-114-3 | 5 | 2 | Pass | Fail | Pass |

Also, the effect of the aromatic monoacrylate oligomer on the performance of AF glass was studied. The monomer demonstrated the characteristics of water solubility but not higher water absorption rate as acrylamide monomer. Therefore, it may play a role in enhancing the mechanical strength or anti-scratch property and antifog property at the same time. More acrylate monomer introduced in the AF film may enhance the mechanical strength of the film but may also increase the hydrophobicity of the film as well possibly resulting in a negative effect on antifog performance. In order to discover a more efficient acrylate monomer, three water soluble acrylate monomers were evaluated.

| ID | 465-111-1 | 465-111-2 | 465-111-3 |
|---|---|---|---|
| Crockmeter, 200 cycles/345 g | 3 | 3 | 3 |
| Tape pull | Pass | Pass | Pass |
| Cross-hatch | 5B | 5B | 5B |
| Windex soaking, 1 hour at r.t | Pass | Pass | Fail |
| Deionized water soaking, 24 hours at r.t | Pass | Pass | Pass |

In addition, the effect of the crosslinking agent on the film was studied. Film prepared by aziridine as crosslinking agent appears to show the best performances used in preparation of AF glass.

| ID | 465-110-1 | 465-110-2 | 465-110-3 |
|---|---|---|---|
| Crosslinking agent | Isocyanate | Aziridine | Polycarbodiimide |
| Crock-meter, 200 cycles/345 g | 1 | 1 | 2 |
| Tape-pull | Pass | Pass | Pass |
| Cross-hatch | 5B | 5B | 5B |
| Freezer testing | Pass/post CH: 5B | Pass/post CH: 5B | Pass/post CH: 5B |
| Windex soaking, 1 hour | Fail | Pass | Fail |
| Deionized water soaking, 24 hours | Pass | Pass | Pass |

Example 10

Coating solution was prepared according to the following:

| Chem. (469-82-2) | wt. (g) |
|---|---|
| Aromatic monoacrylate oligomer | 3 |
| Polycarbodiimide crosslinker | 2.4 |
| Photoinitiator (469-58-1) | 0.4 |
| 15 mole ethoxylated trimethylolpropane triacrylate | 3 |
| Acrylamide solution | 6 |
| 2-hydroxyethyl Acrylate | 12 |
| Polyoxyethylene alkylphenyl ether | 7.5 |
| Total | 34.3 |

For the acrylamide solution, the acrylamide was dissolved in deionized water by stirring for 30 minutes.

| Chem. | Wt. (g) |
|---|---|
| Acrylamide | 2 |
| Deionized water | 15 |

The photoinitiator solution was prepared according to the following:

| Photoinitiator (469-58-1) | Wt. (g) |
|---|---|
| N-Methyl-2-pyrrolidone | 5 |
| 2-Hydroxy-2-methylpropiophenone | 1 |

A carboxymethylcellulose solution (484-40-1) was prepared by providing 1 g of CMC powder with 50 g of deionized water. Then, the solution was set on a ball mill for 24 hours to dissolve the CMC.

The final coating solutions were prepared as follows:

| | Vol (mL) | | |
|---|---|---|---|
| Chem. | 469-170-1 | 469-170-2 | 469-170-3 |
| 469-82-2 | 10 | 10 | 5 |
| 484-40-1 | 5 | 10 | 10 |

Soda-lime glass with thickness of 4 mm is washed by washing machine with deionized water and dried by $N_2$ gas. The glass is placed on an end of a coating machine (BYK). The coating solution was provided to allow for a film thickness of 10-20 microns. The coated glass was cured in a UV chamber with a UV irradiation density of 30 mW/cm$^2$ and a wavelength of 254 nm for 3 to 4 minutes under nitrogen gas. After UV curing, the glass was heated in an oven at 180° C. for 25 minutes to obtain a solid film.

The performance of the coated glass article is provided below.

| ID | 469-170-1 |
|---|---|
| Crock-meter | 1, 1, 1 |
| Tape pull | P, P, P |
| Cross hatch | 5B, 5B, 5B |
| Stud pull, psi | 468 |
| Windex soaking, 1 hour | P, P |
| Water boiling, 1 hour | P, P |
| Cold fog freezer testing (−18° C.) | P, P |

| ID | 469-170-1 |
|---|---|
| Post cold fog/Windex | P/5B; P/5B |
| Post fog/Water boiling/Post crosshatch | P/5B; P/5B |

The linear carboxymethylcellulose chains can penetrate the crosslinked polyacrylate networks to develop a semi-interpenetrating network. Introducing the CMC can improve the water absorption of the film due to the highly water absorption capability of CMC polymers. In addition, the mechanical and adhesive strength may not be detrimentally impacted by the inclusion of the CMC polymer into the network.

Example 11

In this example, two coating layers were provided on a glass substrate. The coating solution was prepared according to the following:

| Solution | wt., g |
|---|---|
| 484-129-1 | 1 |
| 484-90-4 | 2 |
| 484-42-2 | 0.3 |
| 465-57-1 | 0.4 |

| Chem. (484-129-1) | wt. (g) |
|---|---|
| 2-Hydroxy-2-methylpropiophenone | 3 |
| 15 mole ethoxylated trimethylolpropane triacrylate | 4 |
| SR451 | 4 |
| 2-hydroxyethyl Acrylate | 26 |
| Polyoxyethylene alkylphenyl ether | 20 |

For the following solution, the components were added at room temperature and then mixed for 0.5 hours before using.

| Chem. (484-42-2) | wt. (g) |
|---|---|
| Hexamethoxymethyl melamine | 3 |
| Polyol | 2 |
| Catalyst | 0.1 |

| Chem. (484-129-1) | wt. (g) |
|---|---|
| Acrylamide | 4 |
| Deionized water | 30 |

For the following solution, the components were added at room temperature and the acetic acid was added last. The components were stirred at room temperature for 24 hours before using. The solution with 75 g is diluted by 25 g n-propanol to develop the final solution with siloxane and $SiO_2$ nanoparticles.

| Chem. (465-57-1) | wt. (g) |
|---|---|
| n-Propanol | 35 |
| Water | 0.9 |

| Chem. (465-57-1) | wt. (g) |
|---|---|
| Acetic acid | 2.5 |
| Tetraethyl orthosilicate | 1.8 |
| Nano silica particle (IPA-ST-UP) | 10 |

The coating solutions for the second coating layer were prepared according to the following:

| Chem. (469-82-2) | wt. (g) |
|---|---|
| Aromatic monoacrylate oligomer | 3 |
| Polycarbodiimide crosslinker | 2.4 |
| Photoinitiator (469-58-1) | 0.4 |
| 15 mole ethoxylated trimethylolpropane triacrylate | 3 |
| Acrylamide solution | 6 |
| 2-hydroxyethyl Acrylate | 12 |
| Polyoxyethylene alkylphenyl ether | 7.5 |
| Total | 34.3 |

For the acrylamide solution, the acrylamide was dissolved in deionized water by stirring for 30 minutes.

| Chem. | Wt. (g) |
|---|---|
| Acrylamide | 2 |
| Deionized water | 15 |

The photoinitiator solution was prepared according to the following:

| Photoinitiator (469-58-1) | Wt. (g) |
|---|---|
| N-Methyl-2-pyrrolidone | 5 |
| 2-Hydroxy-2-methylpropiophenone | 1 |

Soda-lime glass with thickness of 4 mm is washed by washing machine with deionized water and dried by $N_2$ gas. The glass is placed on an end of a coating machine (BYK). The coating solution was provided to allow for a film thickness of 10-20 microns. The coated glass with the $1^{st}$ coating layer (484-136-2) and $2^{nd}$ coating layer (469-82-2) were cured in a UV chamber with a UV irradiation density of 30 mW/cm$^2$ and a wavelength of 254 nm for 3 to 4 minutes under nitrogen gas. After UV curing, the glass was heated in an oven at 180° C. for 25 minutes to obtain a solid film.

The performance of the coated glass article with a single layer is provided below.

| Test item | Commercial Glass | 484-136-2 |
|---|---|---|
| Optical | | |
| T % | 90.5 | 90.5 |
| R % | 8.4 | 8.3 |
| H % | 0.8 | 0.32 |
| Surface | | |
| Thickness (microns) | 22.3 | 16.1 |
| Water contact angle (degrees) | 13.7 | 82 |
| Antifog | | |
| Fog: 100° C. water steam | Pass | Pass |
| Fog: −18° C. freezer | Pass | Pass |
| Mechanical and Adhesive Strength | | |
| Tape pull | Pass | Pass |
| Cross-hatch | 5 | 5 |
| Crockmeter (345 g of arm, 200 cycles) | 4 | 3 |
| Stud pull (psi) | 1277 | 519 |
| Thermal Stability | | |
| Water boiling (60 min) | Post CH: 5; pass 100° C.; −18° C. (N/A) | Post CH: 5; pass 100° C. and −18° C. |
| Durability | | |
| Windex soaking/De-Water soaking (1 hour, room temperature) | Post CH: 5; pass 100° C.; −18° C. (N/A) | Post CH: 5; pass 100° C. and −18° C. |

The performance of the coated glass of the second coating layer is provided below.

| Coating solution | 469-82-2 |
|---|---|
| Stud pull (psi) | 725, 684 |
| Crockmeter (345 g of arm, 200 cycles) | 1, 1 |
| Cross-hatch | 5B, 5B |
| Tape pull | P, P |
| Cold fog/post CH | Three PCF and PCH: 5 |
| Hot fog, 100° C./post CH | Three PCF and PCH: 5 |
| Windex soaking, 1 hour | Two failed in soaking |
| De-ion water, 24 hours | Three pass soaking, PCF and PCH: 5 |
| Water boiling, 1 hour | Three pass soaking, PCF and PCH: 5 |

The performance of the coated glass includes the first and second coating layers is provided below.

| Coating solution | Properties |
|---|---|
| Stud pull (psi) | 485, 378 |
| Crockmeter (345 g of arm, 200 cycles) | 1, 1 |
| Cross-hatch | 5B, 5B |
| Tape pull | P, P, P |
| Windex soaking, 1 hour | P, P |
| Water boiling, 1 hour | P, P |
| Cold fog (−18° C.) | P, P |
| Post cold fog/Windex soaking | P/5B; P/5B |
| Post fog/Water boiling/Post crosshatch | P/5B; P/5B |

The antifog glass made using two coating layers demonstrated some improved performance in comparison to the individual coating layers. For instance, the mechanical and adhesive strength was improved.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

The invention claimed is:

1. A coated glass substrate comprising
a glass substrate; and
a coating on a surface of the glass substrate wherein the coating includes a binder comprising a polyacrylate and a polyacrylamide wherein at least one of the polyacrylate and the polyacrylamide is crosslinked.

2. The coated glass substrate of claim 1, wherein the polyacrylate is a crosslinked polyacrylate.

3. The coated glass substrate of claim 1, wherein the polyacrylate is formed from a functionalized acrylate.

4. The coated glass substrate of claim 2, wherein the polyacrylate is crosslinked using a diacrylate.

5. The coated glass substrate of claim 1, wherein the polyacrylamide is a crosslinked polyacrylamide.

6. The coated glass substrate of claim 5, wherein the polyacrylamide is crosslinked using a carbodiimide.

7. The coated glass substrate of claim 1, wherein the binder comprises a crosslinked polyacrylate and a crosslinked polyacrylamide.

8. The coated glass substrate of claim 1, wherein the binder further comprises a surfactant including a carbon-carbon double bond or a polymer derived from the surfactant including a carbon-carbon double bond.

9. The coated glass substrate of claim 1, wherein the polyacrylate is modified by a surfactant.

10. The coated glass substrate of claim 1, wherein the transparency of the coated glass substrate after one of the following conditions is within 10% of the transparency of the coated substrate prior to the condition: wherein the coated substrate is stored at a temperature of 0° C. or less and then exposed to an environment at 21° C. and 70% humidity or wherein the coated substrate is positioned within steam 100° C. steam for one minute.

11. The coated glass substrate of claim 1, wherein the coated glass substrate has a contact angle of about 25° or less after 5 seconds.

12. A coated glass substrate comprising
a glass substrate; and
a coating on a surface of the glass substrate wherein the coating includes a binder comprising a polyacrylate and a polyacrylamide wherein at least one of the polyacrylate and the polyacrylamide is crosslinked, and
wherein the transparency of the coated substrate after one of the following conditions is within 10% of the transparency of the coated substrate prior to the condition: wherein the coated substrate is stored at a temperature of 0° C. or less and then exposed to an environment at 21° C. and 70% humidity or wherein the coated substrate is positioned within steam 100° C. steam for one minute.

13. The coated glass substrate of claim 12, wherein the coated substrate has a contact angle of about 25° or less after 5 seconds.

14. The coated glass substrate of claim 12, wherein the binder includes an interpenetrating polymer network.

15. The coated glass substrate of claim 14, wherein the interpenetrating polymer network includes a crosslinked polyol resin.

16. The coated glass substrate of claim 14, wherein the interpenetrating polymer network includes a polysiloxane.

17. The coated glass substrate of claim 12, wherein binder includes a crosslinked polyacrylate and a crosslinked polyacrylamide.

18. A method of forming the coated glass substrate of claim 12, the method comprising:
applying a coating formulation to a glass substrate, the coating formulation comprising a first polymerizable compound including an acrylate monomer, a second polymerizable compound including an acrylamide monomer, and at least one crosslinking agent, and
polymerizing the compounds such that the resulting coating includes a polyacrylate and a polyacrylamide wherein at least one of the polyacrylate and polyacrylamide are crosslinked.

19. The method of claim 18, wherein the coating formulation further includes a polyol, or combinations thereof an organoalkoxysilane, or combinations thereof.

20. The method of claim 18, wherein the crosslinking agent comprises an isocyanate, an amine, an acrylate, a carbodiimide, or a combination thereof.

* * * * *